(12) United States Patent
Voda et al.

(10) Patent No.: US 7,173,348 B2
(45) Date of Patent: Feb. 6, 2007

(54) DEVICE, SYSTEM AND METHOD FOR PREVENTING VEHICLE THEFT

(75) Inventors: Benny Voda, Tel Aviv (IL); David Makover, Tel Aviv (IL)

(73) Assignee: StarTech Automotive Anti Theft Systems Ltd., Jerusalem (IL)

( * ) Notice: Subject to any disclaimer, the term of this patent is extended or adjusted under 35 U.S.C. 154(b) by 561 days.

(21) Appl. No.: 10/376,744

(22) Filed: Mar. 3, 2003

(65) Prior Publication Data

US 2004/0174070 A1  Sep. 9, 2004

(51) Int. Cl.
*B60R 25/00* (2006.01)

(52) U.S. Cl. ..................................... 307/10.2
(58) Field of Classification Search ................ 307/10.2
See application file for complete search history.

(56) References Cited

U.S. PATENT DOCUMENTS

| | | |
|---|---|---|
| 4,209,709 A | 6/1980 | Betton |
| 4,288,778 A | 9/1981 | Zucker |
| 4,533,016 A | 8/1985 | Betton |
| 4,733,638 A | 3/1988 | Anderson |
| 5,045,837 A * | 9/1991 | Gosker ..................... 340/450.2 |
| 5,138,986 A | 8/1992 | Aguilar |
| 5,533,589 A | 7/1996 | Critzer |
| 5,548,164 A | 8/1996 | Hilliard et al. |
| 5,564,376 A | 10/1996 | Labelle et al. |
| 5,808,543 A | 9/1998 | Peyre |
| 5,927,240 A | 7/1999 | Maxon |
| 6,069,411 A | 5/2000 | Charron |
| 6,116,201 A | 9/2000 | LaBelle |
| 6,170,595 B1 | 1/2001 | Denz et al. |
| 6,227,158 B1 | 5/2001 | LaBelle |
| 6,351,209 B1 | 2/2002 | Snyder |

* cited by examiner

*Primary Examiner*—Robert L. Deberadinis

(57) ABSTRACT

A system for preventing theft of a vehicle having at least one essential module being essential to mobilization of the vehicle. The system comprises a control apparatus for controlling operation of the at least one essential module, and at least one armored encapsulation, encapsulating the control apparatus and at least a portion of the essential module. At least one of a shape, configuration, material, size and location of the armored encapsulation within the vehicle is selected so as to prevent accessing the control apparatus without substantially damaging at least one of the armored encapsulation and the essential module, thereby preventing the mobilization of the vehicle.

140 Claims, 15 Drawing Sheets

DEVICE, SYSTEM AND METHOD FOR PREVENTING VEHICLE THEFT

FIELD AND BACKGROUND OF THE INVENTION

The present invention relates to prevention of vehicle theft and, more particularly, to the prevention of vehicle theft using a combination of electronic or mechanical control and physical armored encapsulation.

Vehicle theft is a well-known and widespread crime, causing severe financial damage and affecting the public sense of well-being and morale.

Numerous motor vehicle anti-theft devices are known in the art. These include, inter alia, mechanical locks, electronic alarm systems, electronic engine immobilizers, automatic vehicle location systems and devices for disabling the fuel supply to the engine.

There are a variety of mechanical devices which are designed to prevent the theft of automotive vehicles, by disabling the steering wheel or the gear shift of the vehicle. One commonly known anti-theft mechanical device is manufactured as a rod having hooks at both ends, one for attaching to the steering wheel and the other for attaching to, e.g., the brake pedal. When attached, the rod prevents independent use of the steering wheel and brake, making driving impossible. Such a prior art mechanical device is lengthy and inconvenient and can be defeated by cutting the steering wheel rim or the device by a power saw, or by a skilled lock picker.

Another commonly known anti-theft mechanical device is a lock for disabling the gear shift of the vehicle. The lock includes a base and a rod, and in use, the base is fastened to the body of the vehicle near the gear shift so that, while the vehicle is parked, the gear shift is locked between the base and the rod of the lock and cannot be moved. Again, cutting the gearshift lever by a power saw or skilled lock picking is usually sufficient to defeat the device.

Conventional alarm type theft preventing devices typically comprise a control unit, a loud speaker, a plurality of sensors and a remote controller. The control unit and the loud speaker are installed in the inside of the car, while the remote controller is used for transmitting a control signal to turn the control unit on or off. When the control unit is turned on, it is capable of triggering the loud speaker to give off an alarm signal to frighten the burglar and alert passers-by. Nowadays, it is appreciated that alarm signals themselves are ignored by passers by and thus do not in themselves deter the thief. Thus alarms are typically further equipped with some kind of engine immobilizer. In one kind of immobilizer the power source of the starter is shut off whilst the alarm is given off. Such an immobilizer is only partly successful as often the thief is able to start the vehicle before the alarm is set off, or he is able to disable the alarm. Alternatively, the thief can disable or reduce the operation of the loud speaker by inserting a foamy material thereto. Other known systems choke off the fuel supply to the engine.

A common drawback for many of the anti-theft systems is the ability of the thief to access the anti-theft system thereby to disable it. Some systems offer an armored enclosure to serve as defense against violent attacks of the switching device, and against attempts to tamper with the security system.

U.S. Pat. No. 4,288,778 to Zucker teaches a method of using digital electronic anti-theft system integrally formed with a vehicle component.

U.S. Pat. No. 4,209,709 to Betton discloses an electronic ignition system in which electronic circuitry is located in an auxiliary metallic housing which is configured to surround both the solenoid and starter motor of the vehicle. The electrical interconnection between the circuitry and the solenoid are accomplished within the protection of the auxiliary housing. U.S. Pat. No. 4,533,016 to Betton, discloses an electronic circuit enclosed within a solenoid housing with means for inhibiting actuation of the solenoid in the absence of entry of a predetermined code from the ignition switch of the vehicle.

French patent FR2764570 to Duval discloses a keypad controlling a starter relay voltage supply, where the starter motor may further be locked. Anti-theft screws with security lugs are used to avoid dismantling of the starter.

U.S. Pat. No. 5,564,376 to Labelle, discloses a housing, which is connectable to the starter motor casing, and serves as enclosure to a control circuit. U.S. Pat. No. 6,227,158 to Labelle discloses a similar arrangement for the starter solenoid, U.S. Pat. No. 6,116,201 and WO0071395 to Labelle teach the use of the starter solenoid housing itself as enclosure for an integrated security chip.

Also of prior art of interest are devices which are used to control the security system. These include, U.S. Pat. No. 4,733,638 which discloses a hand-held transmitter, French Patent No. FR2769562 which discloses the use of an RF signal, U.S. Pat. No. 6,069,411 which discloses the use the Electronic Serial Number of a cellular phone as an ID code, U.S. Pat. No. 5,808,543 which discloses such a system dependent on a radio frequency identification device badge usually used in vehicle key systems, and U.S. Pat. No. 5,704,008 which teaches a voice or password recognition control of the starter solenoid.

Despite the use of the above devices, thieves nevertheless find ways and means of overcoming (e.g., by bypassing) the various protection devices. Mechanical locking devices are broken and by-passed, cut-off valves are circumvented or disabled, electronic engine immobilizers are hot-wired and even sophisticated anti-theft systems are overcome by key-theft or lock picking. A recently observed theft method involves a replacement kit for the vehicle Engine Control Unit (ECU), which is used to bypass the whole security system. A thief equipped with a pre-prepared replacement kit, a key and a key decoder, can fit the unit within minutes and drive away with the vehicle.

It is thus appreciated that the non-accessibility of the anti-theft system to the thief is of utmost importance. Furthermore, it is important that such non-accessible system would be protected against bypassing. Many known physically armored devices are aimed at protecting the vehicle via starter disabling methods. Such devices may be categorized into two groups, built-in control devices, destined to be integrated within the solenoid housing, and add-on armored control devices, destined to be mounted over the solenoid housing. Built-in control devices require re-design of the starter solenoid for new vehicles, or the exchange of a solenoid or solenoid-starter assembly in pre-existing vehicles.

Add-on armored control devices according to prior art require very large protective covers that may interfere with engine compartment serviceability and with proper ventilation of the engine bay. In addition, installation of presently known add-on armored control devices is very complicated, if at all possible, in existing vehicles. Furthermore, prior art built-in or add-on control devices may be unable to withstand the harsh environmental conditions typical of vehicle engine compartments.

There is thus a widely recognized need for, and it would be highly advantageous to have, a system for preventing vehicle theft devoid of the above limitations.

SUMMARY OF THE INVENTION

According to one aspect of the present invention there is provided a system for preventing theft of a vehicle having at least one essential module being essential to mobilization of the vehicle, the system comprising: a control apparatus for controlling operation of the at least one essential module; and at least one armored encapsulation, encapsulating the control apparatus and at least a portion of the at least one essential module; wherein at least one of a shape, configuration, material, size and location of the at least one armored encapsulation within the vehicle is selected so as to prevent accessing the control apparatus without substantially damaging at least one of the at least one armored encapsulation and the at least one essential module, thereby preventing the mobilization of the vehicle.

According to further features in preferred embodiments of the invention described below, the system further comprises a communication device, being able to communicate with a remote control center, the communication device being operable to transmit signals to the remote control center and receive responses, if the at least one armored encapsulation is at least partially damaged, thereby to apply activation or deactivation commands to the control apparatus.

According to another aspect of the present invention there is provided a method of installing a theft-preventing system within a vehicle having at least one essential module being essential to mobilization of the vehicle, the method comprising: providing a control apparatus and positioning the control apparatus so as to control operation of the at least one essential module; and encapsulating the control apparatus and at least a portion of the at least one essential module using at least one armored encapsulation; the encapsulating being such that at least one of a shape, configuration, material, size and location of the at least one armored encapsulation within the vehicle is selected so as to prevent accessing the control apparatus without substantially damaging the at least one armored encapsulation and the at least one essential module, thereby preventing the mobilization of the vehicle.

According to further features in preferred embodiments of the invention described below, the method further comprises providing a self-destructing assembly and positioning the self-destructing assembly within the at least one armored encapsulation, wherein the self-destructing assembly is designed and constructed so that if the at least one armored encapsulation is at least partially damaged, the self-destructing assembly disintegrates, hence providing the damaging of the at least one essential module.

According to still further features in the described preferred embodiments a body of the at least one armored encapsulation is selected from the group consisting of a shell body and a solid body.

According to still further features in the described preferred embodiments the encapsulating comprises independently integrating the control apparatus and the at least a portion of the at least one essential module in the solid body of the at least one armored encapsulation.

According to still further features in the described preferred embodiments the encapsulating comprises rotating a first part of the at least one armored encapsulation relative to a second part of the at least one armored encapsulation so as to match orientation of the at least one essential module.

According to still further features in the described preferred embodiments the method further comprises providing a heat isolating interface, and positioning the heat isolating interface between the at least one armored encapsulation and an engine bay of the vehicle, for preventing heat transfer from the engine to the at least one armored encapsulation.

According to still further features in the described preferred embodiments the method further comprises providing a user interface device, and configuring the user interface device to electrically communicate with the control apparatus so as to activate or deactivate the control apparatus.

According to still further features in the described preferred embodiments the electrical communication between the user interface device and the control apparatus is elected from the group consisting of a wireless electrical communication and a wirefull electrical communication.

According to still further features in the described preferred embodiments the method further comprises providing a communication device being able to communicate with a remote control center and positioning the communication device within the at least one armored encapsulation, wherein the communication device being operable to transmit signals to the remote control center and receive responses, if the at least one armored encapsulation is at least partially damaged, thereby to apply activation or deactivation commands to the control apparatus.

According to still further features in the described preferred embodiments the method further comprises positioning at least one elongator so as to increase a volume defined in the at least one armored encapsulation, the volume being sufficient for encapsulating the control apparatus.

According to still further features in the described preferred embodiments the positioning at least one elongator is by connecting the at least one elongator to at least one existing component of the at least one essential module with a minimal volume increment thereof.

According to still further features in the described preferred embodiments the method further comprises fastening the at least one armored encapsulation to a body of the vehicle using at least one security nut, the at least one security nut being designed and constructed for preventing a removal of the at least one armored encapsulation.

According to still further features in the described preferred embodiments at least one of the at least one security nut comprises a first part, a second part and a third part, the second part being positioned between the first and the third part and comprises a detachable material so that if a shear force applied onto the first part exceeds a predetermined maximal value, the first part detaches from the third part.

According to still further features in the described preferred embodiments the connecting the at least one security nut is by applying a shear force being larger than the predetermined maximal value, so as to detach the first part from the third part.

According to still further features in the described preferred embodiments the method further comprises providing at least one locking device and positioning the at least one locking device so as to allow a removal of at least a portion of the at least one armored encapsulation without causing damage to the at least one armored encapsulation, by a predetermined procedure.

According to still further features in the described preferred embodiments positioning the at least one locking device comprises bypassing the control apparatus through the at least one locking device.

According to still further features in the described preferred embodiments the method further comprises bypassing the control apparatus using a bypassing device.

According to still further features in the described preferred embodiments the bypassing the control apparatus using the bypassing device comprises connecting an electrical switch of the bypassing device to the at least one essential module, so that so the control apparatus is bypassed if a predetermined procedure is executed.

According to still further features in the described preferred embodiments the positioning the control apparatus is done so as to control electrical signals transmitted through a signal wire connecting an ignition switch of the vehicle and a starter solenoid of the vehicle.

According to still further features in the described preferred embodiments the encapsulating is done so as to encapsulate essentially the control apparatus and the signal wire.

According to still further features in the described preferred embodiments the positioning the control apparatus is done so as to limit a motion of a mechanical shift lever being operatively associated with a starter motor of the vehicle, thereby to indirectly prevent the starter motor from rotating an engine of the vehicle.

According to still further features in the described preferred embodiments the positioning the control apparatus is done so as to control motion of an internal plunger of a starter solenoid of the vehicle, thereby to indirectly prevent a starter motor of the vehicle from rotating an engine of the vehicle.

According to still further features in the described preferred embodiments, the positioning the control apparatus is done so as to control electrical signals transmitted through a wire winding the internal plunger, in such a manner that when the electrical signals are transmitted, the motion of the internal plunger is allowed, and when the electrical signals are terminated, the motion of the internal plunger is disabled.

According to still further features in the described preferred embodiments the positioning the control apparatus is done so as to mechanically limit the motion of the internal plunger.

According to still further features in the described preferred embodiments the mechanically limiting is by a mechanical actuator.

According to still further features in the described preferred embodiments the bypassing the control apparatus is by disabling the mechanical actuator so as to allow the motion of the internal plunger.

According to still further features in the described preferred embodiments the mechanically limiting is by an elongation rod, connected to the internal plunger, and a blocking mechanism, compatible with the elongation rod and positioned opposite thereto.

According to still further features in the described preferred embodiments the bypassing the control apparatus is by disabling the blocking mechanism so as to allow the motion of the internal plunger.

According to still further features in the described preferred embodiments the positioning the control apparatus comprises connecting the control apparatus to a power-supply unit of the vehicle so as to bypass at least one electrolytic cell of the power-supply, thereby to control a value of voltage supplied by the power-supply unit.

According to still further features in the described preferred embodiments the encapsulating is done so as to encapsulate at least one terminal of the power-supply unit, at least one terminal of a starter solenoid of the vehicle and at least one wire connecting the at least one terminal of the power-supply unit and the at least one terminal of the starter solenoid.

According to yet another aspect of the present invention there is provided a starting system, for starting operation of an engine of a vehicle, the starting system having a starter and a system for preventing theft of the vehicle, the system comprising: a control apparatus for controlling operation of the starter; and at least one armored encapsulation, encapsulating the control apparatus and at least a portion of the starter; wherein at least one of a shape, configuration, material, size and location of the at least one armored encapsulation within the vehicle is selected so as to prevent accessing the control apparatus without substantially damaging the at least one armored encapsulation and the starter, thereby preventing the mobilization of the vehicle.

According to still another aspect of the present invention there is provided a solenoid system for controlling supply of electrical current to a starter of a vehicle, the solenoid system being encapsulated by an armored encapsulation and having a solenoid and a system for preventing theft of the vehicle, the system comprising a control apparatus for controlling motion of an internal plunger, wherein the controlling the motion is selected from the group consisting of mechanically controlling and electrically controlling.

According to still a further aspect of the present invention there is provided a power-supply device for supplying power to a vehicle and preventing theft thereof, the power-supply device comprising a plurality of electrolytic cells and a short circuit controlled by a switching device, the short circuit being connected so as to bypass at least one of the plurality of electrolytic cells, thereby to control a value of voltage supplied by the power-supply device.

According to further features in preferred embodiments of the invention described below, the power-supply device further comprises a self-destructing assembly being designed and constructed so that if the power-supply device is at least partially damaged, the self-destructing assembly disintegrates, hence disabling at least one of the plurality of electrolytic cells.

According to still further features in the described preferred embodiments the self-destructing assembly comprises a conducting foil and at least one compatible connector connected to the conducting foil.

According to still a further aspect of the present invention there is provided a system for preventing theft of a vehicle having at least one essential module being essential to mobilization of the vehicle, the system comprising: a control apparatus for controlling operation of the at least one essential module; a volume generating mechanism for generating a volume surrounding the control apparatus, the volume generating mechanism being compatible with at least one existing component of the at least one essential module; and at least one armored encapsulation, encapsulating the control apparatus and at least a portion of the at least one essential module; wherein at least one of a shape, configuration, material, size and location of the at least one armored encapsulation within the vehicle is selected so as to prevent accessing the control apparatus without substantially damaging the at least one armored encapsulation and the at least one essential module, thereby preventing the mobilization of the vehicle.

According to still further features in the described preferred embodiments the volume generating mechanism comprises at least one elongator positioned so as to increase a volume defined in the at least one armored encapsulation, the volume being sufficient for encapsulating the control apparatus.

According to still further features in the described preferred embodiments the at least one elongator is sizewise compatible with the control apparatus and geometrically compatible with the at least one existing component of the at least one essential module, so that the control apparatus, the at least one elongator, the at least one existing component and the at least one armored encapsulation form a substantially compact assembly.

According to still further features in the described preferred embodiments the at least one elongator is constructed and designed for preventing electric contact between the at least one armored encapsulation and the control apparatus.

According to still further features in the described preferred embodiments the at least one elongator is designed compatible to at least one integral component of the at least one essential module.

According to still further features in the described preferred embodiments the at least one existing component of the at least one essential module is a nut.

According to still further features in the described preferred embodiments the at least one elongator is made of a combination of a conductive material and an insulating material.

According to still further features in the described preferred embodiments the at least one essential module is selected from the group consisting of a starter, an integrated starter-alternator device, a Dynamo-Starter device, a starter-generator, a power-supply unit, a hand brake, a gearshift selector and an electric part of a hybrid-powered vehicle.

According to still further features in the described preferred embodiments the system further comprises a heat isolating interface, positioned between the at least one armored encapsulation and an engine bay of the vehicle, for preventing heat transfer from the engine to the at least one armored encapsulation.

According to still further features in the described preferred embodiments the system further comprises at least one locking device for allowing a removal of at least a portion of the at least one armored encapsulation by a predetermined procedure, without causing damage to the at least one armored encapsulation.

According to still further features in the described preferred embodiments the at least one locking device comprises an electrical switch connected to the solenoid so that if the predetermined procedure is executed, the control apparatus is bypassed.

According to still further features in the described preferred embodiments the at least one locking device comprises an electrical switch connected to the starter so that if the predetermined procedure is executed, the control apparatus is bypassed.

According to still further features in the described preferred embodiments the control apparatus is designed and constructed so as to control electrical signals transmitted through a signal wire connecting an ignition switch of the vehicle and a solenoid of the starter.

According to still further features in the described preferred embodiments the control apparatus is operable to limit a motion of a mechanical shift lever being operatively associated with a starter motor of the vehicle, thereby to indirectly prevent the starter motor from rotating the engine of the vehicle.

According to still further features in the described preferred embodiments the control apparatus is designed and constructed so as to control motion of an internal plunger of a solenoid of the starter, thereby to indirectly prevent a starter motor of the vehicle from rotating the engine of the vehicle.

According to still further features in the described preferred embodiments the system further comprises a self-destructing assembly positioned within the at least one armored encapsulation, the self-destructing assembly being designed and constructed so that if the at least one armored encapsulation is at least partially damaged, the self-destructing assembly disintegrates, hence providing the damaging of the at least one essential module.

According to still further features in the described preferred embodiments the armored encapsulation being at least partially damaged is selected from the group consisting of the armored encapsulation being at least partially bended, the armored encapsulation being at least partially twisted, the armored encapsulation being at least partially strained, the armored encapsulation being at least partially opened and the armored encapsulation being at least partially broken.

According to still further features in the described preferred embodiments the self-destructing assembly comprises a conducting foil.

According to still further features in the described preferred embodiments the at least one armored encapsulation is designed to be locatable within an engine bay of the vehicle.

According to still further features in the described preferred embodiments the at least one armored encapsulation is designed to be sufficiently small so as to allow ventilation within the engine bay.

According to still further features in the described preferred embodiments the at least one armored encapsulation is designed and constructed so as to prevent heating of the control apparatus.

According to still further features in the described preferred embodiments the at least one armored encapsulation comprises a material characterized by low heat capacity.

According to still further features in the described preferred embodiments the at least one armored encapsulation comprises at least one reflective layer capable of reflecting heat radiation therefrom.

According to still further features in the described preferred embodiments the at least one armored encapsulation comprises at least two layers separated by a medium capable of preventing heat convection.

According to still further features in the described preferred embodiments the control apparatus and the at least the portion of the at least one essential module are each independently integrated in the solid body of the at least one armored encapsulation.

According to still further features in the described preferred embodiments the at least one armored encapsulation comprises a first part, and a second part being geometrically compatible with the first part, the first and the second parts being rotatable to a plurality of angles.

According to still further features in the described preferred embodiments the at least one armored encapsulation comprises a plurality of positioning pairs, each corresponding to one angle of the plurality of angles.

According to still further features in the described preferred embodiments the plurality of positioning pairs comprise at least one pin-groove pair.

According to still further features in the described preferred embodiments the control apparatus comprises at least one electronic circuit assembly being formed in a dielectric material selected to withstand any one of high temperature, moisture, electrical sparks, mechanical vibrations and chemical vapors.

According to still further features in the described preferred embodiments the system further comprises a user interface device, electrically communicating with the control apparatus, the user interface device being designed and constructed for activating and deactivating the control apparatus.

According to still further features in the described preferred embodiments the electrical communication between the user interface device, and the control apparatus, is elected from the group consisting of a wireless electrical communication and a wirefull electrical communication.

According to still further features in the described preferred embodiments the user interface device comprises recognition circuitry for recognizing a user prior to the activating and deactivating.

According to still further features in the described preferred embodiments the recognition circuitry is selected from the group consisting of keyed-in password recognition circuitry, spoken password recognition circuitry, biometric voice recognition circuitry, biometric fingerprint recognition circuitry, biometric bone structure recognition circuitry and biometric iris-patterns recognition circuitry.

According to still further features in the described preferred embodiments the system further comprises at least one security nut for fastening the at least one armored encapsulation to a body of the vehicle, the at least one security nut being designed and constructed for preventing removal of the at least one armored encapsulation.

According to still further features in the described preferred embodiments at least one of the at least one security nut comprises a first part, a second part and a third part, the second part being positioned between the first and the third part and comprises a detachable material so that if a shear force applied onto the first part exceeds a predetermined maximal value, the first part detaches from the third part.

According to still further features in the described preferred embodiments a shape of the third part is characterized by smooth edges designed so as to prevent opening of the third part, thereby to prevent removal of the at least one armored encapsulation.

According to still further features in the described preferred embodiments the first and the second parts have a sufficiently large combined longitudinal dimension so as to encapsulate the at least one elongator.

According to still further features in the described preferred embodiments the control apparatus is designed and constructed so as to control electrical signals transmitted through a signal wire connecting an ignition switch of the vehicle and a starter solenoid of the vehicle.

According to still further features in the described preferred embodiments the control apparatus comprises a relay and an electronic circuit controlling the relay so as to toggle a state of the signal wire from a transmissive state to a non-transmissive state.

According to still further features in the described preferred embodiments the size of the at least one armored encapsulation is selected to substantially encapsulate the control apparatus and the signal wire.

According to still further features in the described preferred embodiments the control apparatus is operable to limit a motion of a mechanical shift lever being operatively associated with a starter motor of the vehicle, thereby to indirectly prevent the starter motor from rotating an engine of the vehicle.

According to still further features in the described preferred embodiments the control apparatus is designed and constructed so as to control motion of an internal plunger of a starter solenoid of the vehicle, thereby to indirectly prevent a starter motor of the vehicle from rotating an engine of the vehicle.

According to still further features in the described preferred embodiments the control apparatus comprises an electrical switch operable to control electrical signals transmitted through a wire winding the internal plunger, so that when the electrical signals are transmitted, the motion of the internal plunger is allowed, and when the electrical signals are terminated, the motion of the internal plunger is disabled.

According to still further features in the described preferred embodiments the control apparatus comprises a mechanical actuator operable to limit the motion of the internal plunger.

According to still further features in the described preferred embodiments the control apparatus comprises an elongation rod, connected to the internal plunger, and a blocking mechanism, compatible with the elongation rod and positioned opposite thereto, the blocking mechanism and the elongation rod being designed and constructed so as to selectively limit the motion of the internal plunger.

According to still further features in the described preferred embodiments the system further comprises a bypassing device for bypassing the control apparatus by a predetermined procedure.

According to still further features in the described preferred embodiments the bypassing device comprises an electrical switch connected to the at least one essential module so that if the predetermined procedure is executed, the control apparatus is bypassed.

According to still further features in the described preferred embodiments the bypassing device is operable to disable the mechanical actuator in such a manner that the motion of the internal plunger is allowed.

According to still further features in the described preferred embodiments the bypassing device is operable to disable the blocking mechanism in such a manner that the motion of the internal plunger is allowed.

According to still further features in the described preferred embodiments the control apparatus comprises a short circuit controlled by a switching device, the short circuit being connected to a power-supply unit of the vehicle so as to bypass at least one electrolytic cell of the power-supply, thereby to control a value of voltage supplied by the power-supply unit.

According to still further features in the described preferred embodiments the at least one armored encapsulation is designed and constructed so as to encapsulate at least one terminal of the power-supply unit, at least one terminal of a starter solenoid of the vehicle and at least one wire connecting the at least one terminal of the power-supply unit and the at least one terminal of the starter solenoid.

According to yet an additional aspect of the present invention there is provided a method of preventing theft of a vehicle having a solenoid for controlling supply of electrical current to a starter of the vehicle, the method comprising selectively preventing motion of an internal plunger of the solenoid, thereby preventing initial ignition of the vehicle.

According to still further features in the described preferred embodiments the selectively preventing comprises using an electrical switch operable to control electrical signals transmitted through a wire winding the internal plunger, so that when the electrical signals are transmitted, the motion of the internal plunger is allowed, and when the electrical signals are terminated, the motion of the internal plunger is disabled.

According to still further features in the described preferred embodiments the selectively preventing comprises using a mechanical actuator for selectively limiting the motion of the internal plunger.

According to still further features in the described preferred embodiments the selectively preventing comprises using an elongation rod, connected to the internal plunger, and a blocking mechanism, compatible with the elongation rod and positioned opposite thereto, for selectively limiting the motion of the internal plunger.

According to still further features in the described preferred embodiments the method further comprises providing at least one locking device and positioning the at least one locking device so as to allow a removal of at least a portion of an armored encapsulation of the solenoid without causing damage to the at least one armored encapsulation by a predetermined procedure.

According to still further features in the described preferred embodiments the positioning the at least one locking device comprises bypassing the electrical switch through the at least one locking device.

According to still further features in the described preferred embodiments the selectively preventing the motion comprises irreparably disabling the motion, if an attempt is made to open an armored encapsulation of the solenoid.

The present invention addresses the shortcomings of the presently known configurations by providing a system for and method of preventing vehicle theft far exceeding prior art systems and method.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
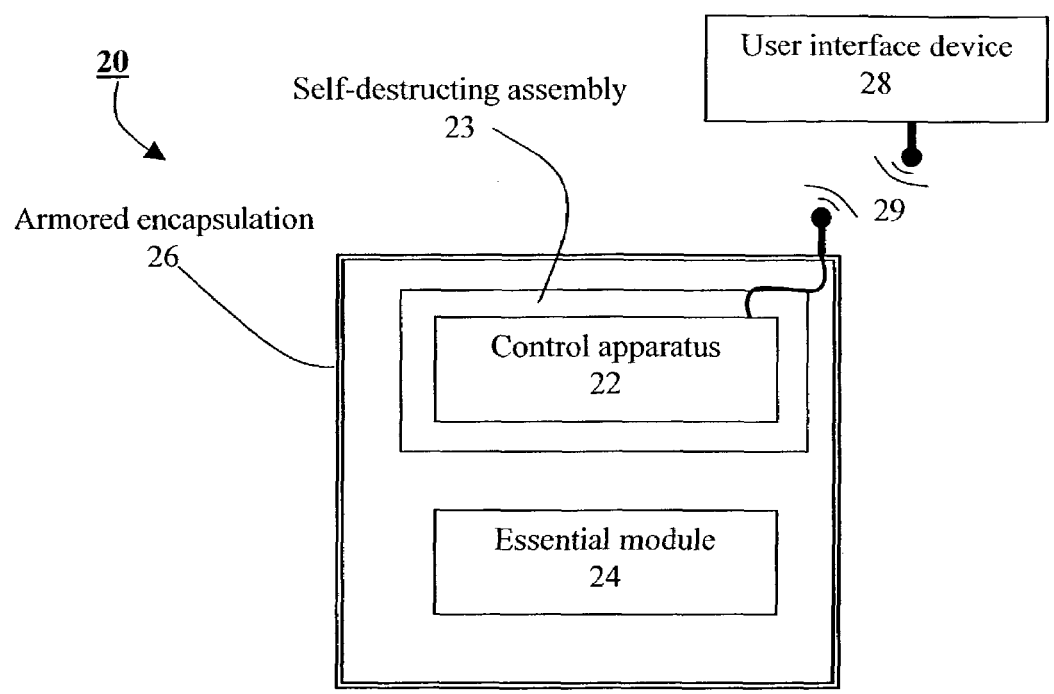
FIG. 1 is a schematic illustration of a system for preventing theft of a vehicle, according to a preferred embodiment of the present invention.

The present embodiments are of a system for preventing theft of a vehicle, which can be installed in various locations within the vehicle. Specifically, the present embodiments are of a system which combines electronic or mechanical control with a physical armored encapsulation. The present embodiments are further of a method of installing the system and a method of preventing theft of the vehicle. The present embodiments are still further of a starter system, a solenoid system and a power-supply device, incorporating the principles of the system.

The principles and operation of a system for preventing theft of a vehicle according to the present embodiments may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to one aspect of the present invention there is provided a system for preventing theft of a vehicle, the vehicle having at least one essential module. The essential module can be any module which is essential to mobilization of the vehicle, e.g., a starter, a power-supply unit, a hand brake, an integrated starter-alternator device, a Dynamo-Starter device (also known as dynostart), a gearshift selector, an electric part of a hybrid-powered vehicle, and the like.

Referring now to the drawings, FIG. 1 is a schematic illustration of a system according to a first preferred embodiment of the present invention. System 20 comprises a control apparatus 22 for controlling operation of essential module 24, and both the control apparatus and the essential module are housed within an armored encapsulation 26. One or more of the shape, configuration, material, size and/or location of armored encapsulation 26 within the vehicle is designed so as to prevent accessing control apparatus 22 without substantially damaging armored encapsulation 26. The armored encapsulation is designed so that if it is damaged, so is the essential module 24, thereby preventing the mobilization of the vehicle. A number of possibilities for achieving such a result are described in greater detail hereinbelow. According to a preferred embodiment of the present invention armored encapsulation 26 is designed to be located within an engine bay of the vehicle. Furthermore, armored encapsulation 26 is preferably designed to be sufficiently small so as to allow ventilation within the engine bay.

According to preferred embodiments of the present invention armored encapsulation 26 may have a shell body, a solid body or a combination thereof. Thus, in one embodiment control apparatus 22 and the portion of essential module 24 are surrounded by the shell body of armored encapsulation 26 and in another embodiment the portion of essential module 24 and/or control apparatus 22 are integrated in the solid body armored encapsulation 26.

Armored encapsulation 26 is preferably designed and constructed so as to prevent malfunctioning of control apparatus 22 by heating. Such malfunctioning prevention may be achieved in more than one way. For example, in one embodiment, armored encapsulation 26 comprises a material characterized by low heat capacity; in another embodiment armored encapsulation 26 comprises at least one reflective layer being for reflecting heat radiation therefrom; in an additional embodiment armored encapsulation 26 comprises at least two layers which are separated by a medium capable of preventing heat convection; in still an additional embodiment, armored encapsulation 26 is connected to the engine bay via a heat isolating interface, for preventing heat transfer from engine to armored encapsulation 26.

The heating of control apparatus 22 may also be prevented by selecting an appropriate material from which to form control apparatus 22. For example, if control apparatus 22 comprises one or more electronic circuit assemblies, these assemblies are preferably formed or implanted in a dielectric material which is selected to withstand high temperature. Additionally and preferably the dielectric material also withstands moisture, electrical sparks, mechanical vibrations and/or chemical vapors.

According to a preferred embodiment of the present invention, control apparatus 22 may be activated automatically when the vehicle is in a static state or, alternatively, control apparatus 22 may be activated by the user via a user interface device 28, electrically communicating with control apparatus 22, e.g., via a communication device 29. User interface device 28 also serves for deactivating control apparatus 22, before the vehicle departs. To prevent the use of user interface device 28 by an unauthorized person, user interface device 28 preferably comprises recognition circuitry, such as, but not limited to, keyed-in password recognition circuitry, spoken password recognition circuitry, biometric voice recognition circuitry, biometric fingerprint recognition circuitry, biometric bone structure recognition circuitry and/or biometric iris-patterns recognition circuitry.

Communication device 29 may also serve for communicating with a remote control center, thereby combining system 20 with an Automatic Vehicle Location (AVL) system. It should be understood that in certain systems, more than one communication device may be used, for example, a single system may use a short-range communication device for establishing communication between the user and control apparatus, and a long-range communication device for establishing communication between system 20 and the remote control center. Any of the communication devices may be wireless (e.g., employing a radiofrequency (RF) transmitter-receiver) or wired.

As used herein, the phrase communication device 29 interchangeably refers to any and all suitable communication devices.

Thus, if armored encapsulation 26 is partially damaged, communication device 29 transmits signals to an AVL operator, who may manually transmit responses back to communication device 29 for activating control apparatus 22, thereby to immobilize the vehicle.

According to a preferred embodiment of the present invention, system 20 may further comprise a self-destructing assembly 23 designed and positioned so that any attempt to open or punch armored encapsulation 26 results in a total electrical discontinuity. More specifically, if and when armored encapsulation 26 is at least partially damaged, self-destructing assembly 23 disintegrates and disables essential module 24.

One example of a self-destructing assembly 23 is a thin wide conductor, such as, but not limited to, flex wire circuits coupled with thin and protected wide connectors. The flex wire circuits disintegrate upon a violent attempt to open or punch armored encapsulation 26, and the protected wide connectors prevent the thief from creating an alternative contact ("hot-wiring"). Preferably, the self-destructing assembly is positioned in a non-accessible location, e.g., buried within armored encapsulation 26.

Before providing a further detailed description of system 20 for preventing theft of a vehicle, as delineated hereinabove and in accordance with the present embodiments, attention will be given to the advantages offered thereby.

The system operates at two protection levels. A first protection level is provided by control apparatus 22 which disables the functionality of essential module 24 when the vehicle is in a static state, and a second protection level is provided by armored encapsulation 26 when an attempt to bypass the first protection occurs. In this case, the design and installation of armored encapsulation 26 preferably causes essential module 24 to be damaged beyond immediate repair. Thus, since it is impossible to mobilize the vehicle without complete functioning of essential module 24, the theft is prevented.

Another advantage of the present embodiments over prior-art systems is that the present embodiments do not present a risk that might accidentally hamper the vehicle safety while in motion. It is recognized that many prior art systems, such as systems that are based on selective control of engine ignition circuits, fuel supply lines and the like, may become operative while the vehicle is mobile, for example due to malfunction or due to accidental activation. Such failure may lead to loss of ignition, engine stall and eventually loss of control by the driver due to the absence of power steering and power assisted braking.

A more detailed description of the preferred embodiments of the present invention is now provided.

Hence, in one embodiment, essential module 24 is the starter of the vehicle. In this embodiment control apparatus 22 is designed and constructed so as to control the operation of the starter. This may be done, for example, by controlling electrical signals transmitted through a signal wire which connects the ignition switch with the starter solenoid of the vehicle.

Figure 2A:
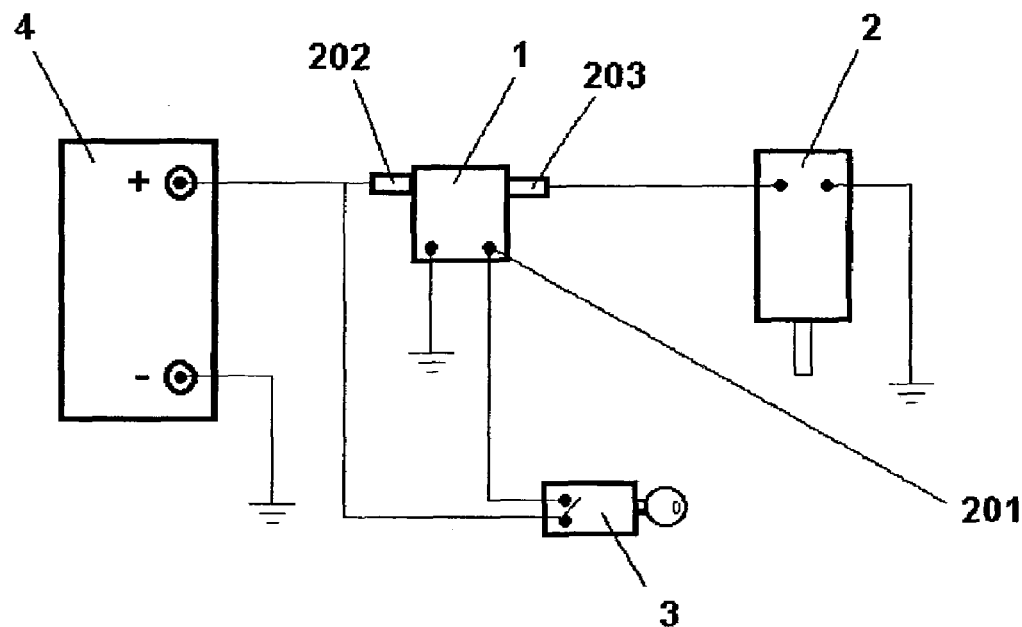
FIGS. 2a–b are schematic illustrations of an initial ignition circuit without (a) and with (b) the system for preventing theft of a vehicle, according to a preferred embodiment of the present invention.
Figure 2B:
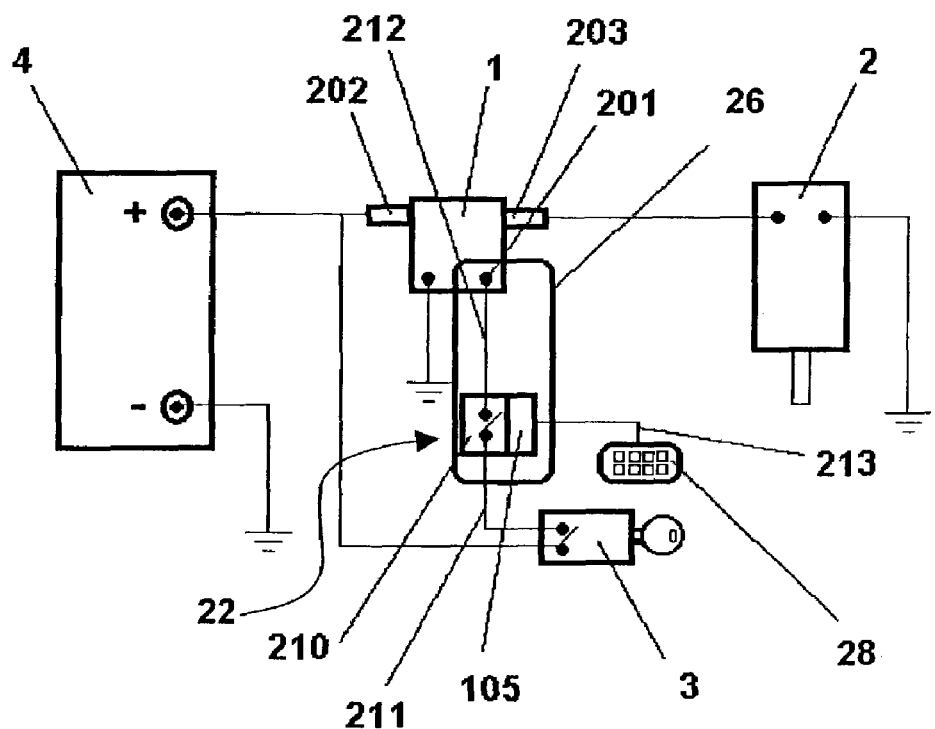

Reference is now made to FIGS. 2*a*–*b* which are schematic illustrations of an initial ignition circuit without (FIG. 2*a*) and with (FIG. 2*b*) the system for preventing theft of the vehicle, as delineated hereinabove. The initial ignition circuit commonly includes a solenoid 1, a starter motor 2 and an ignition switch 3. Solenoid 1 is typically connected to a power-supply unit 4 via a "B" terminal 202; to starter motor 2 via an "M" terminal 203 and to ignition switch 3 via an "S" terminal 201. The "S" terminal is connected to a signal wire having a first end 211 and a second end 212. Terminals 201, 202 and 203 typically carry a voltage of 12, 24 and/or 42 volts DC, but other voltage values are not excluded. "S" terminal 201 typically carries a low power signal, while the power carried by terminals 202 and 203 is typically higher. Solenoid 1, starter motor 2 and power-supply unit 4 are typically grounded to a large conductive material, e.g., to the vehicle body.

Figure 3A:
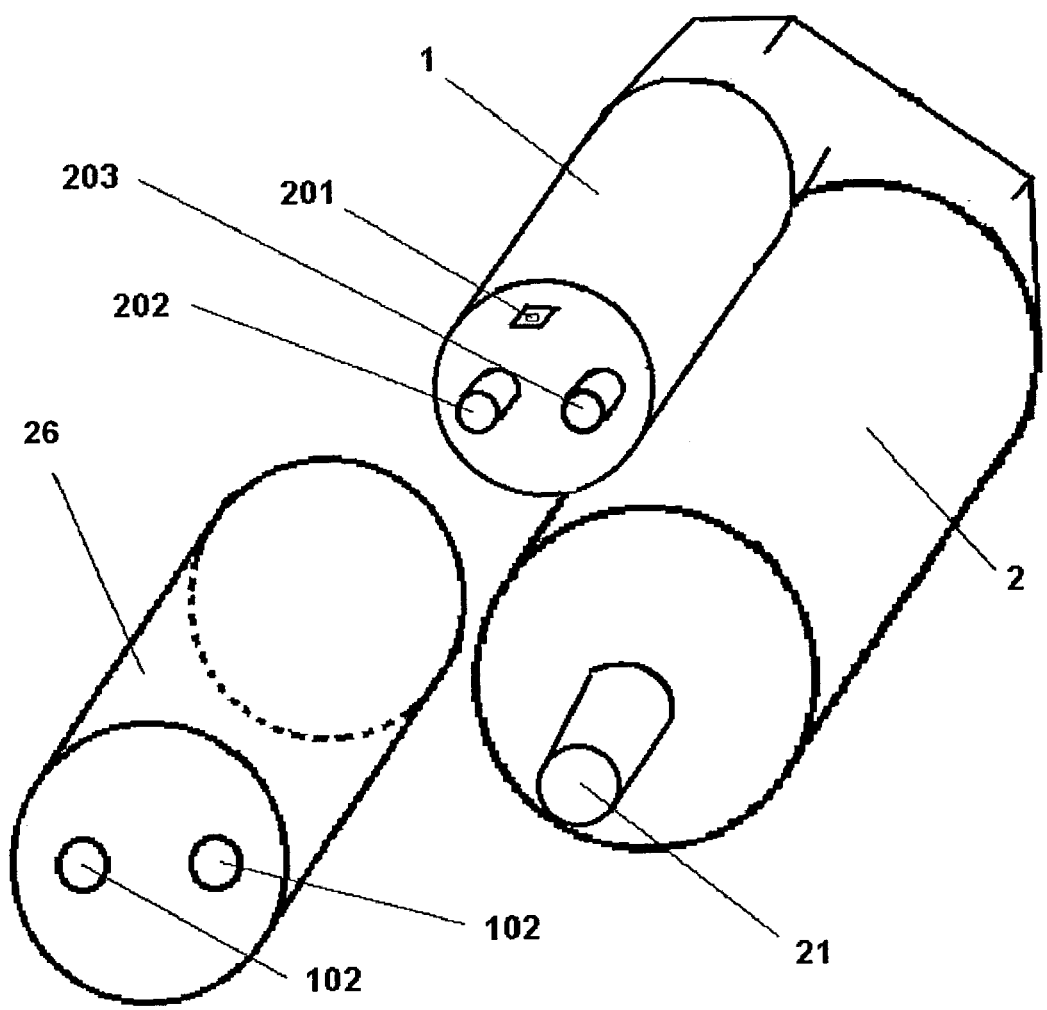
FIG. 3a is a schematic illustration of a starter, a solenoid and armored encapsulation, according to a preferred embodiment of the present invention.

Reference is now made to FIG. 3*a*, which is a schematic illustration of starter motor 2, solenoid 1 and armored encapsulation 26. When ignition switch 3 is switched on and pressed further to a spring-loaded position, solenoid 1 supplies high current to motor 2. Once supplied with sufficiently high current, a shaft 21 of motor 2 engages a compatible shaft in the vehicle's engine (not shown). At the same time, shaft 21 rotates the compatible shaft thereby enabling initial ignition or cranking of the engine.

According to a preferred embodiment of the present invention, control apparatus 22 comprises a relay 210 and an electronic circuit 105 controlling relay 210, so as to toggle signal wire 211/212 between a transmissive state and a non-transmissive state. As stated, control apparatus 22 preferably communicates with a user interface device 28. In this embodiment, user interface device 28 communicates with circuit 105, e.g., via wire 213 or via communication device 29 (not shown in FIGS. 2*a*–*b*), and hence serves for operating relay 210, depending on the choice of the authorized user. As stated, communication device 29 may also be wireless, thus, the electrical communication between user interface device 28 and circuit 105 is preferably by RF radiation.

Thus, when signal wire 211/212 is toggled by relay 210 to a non-transmissive state, signals cannot be transmitted from first end 211 to second end 212, and motor 2 does not engage the engine. According to a preferred embodiment of the present invention the size of armored encapsulation 26 is selected to encapsulate essentially "S" terminal 201, control apparatus 22 (including relay 210 and circuit 105) and first end 211. The protection of terminals 202 and 203 is not required because supplying power to these terminals only causes motor 2 to rotate without being engaged to the engine, thus cranking does not occur.

A particular advantage of the presently preferred configuration of this embodiment is that, unlike prior art systems, only a portion of the starter components are encapsulated, whereas other, relatively large, components are not encapsulated. One ordinarily skilled in the art would appreciate that such configuration minimizes the size of the system and hence facilitates easy installation, and, in addition, minimizes undesired intervention of the system with other vehicle systems. The present embodiment therefore keeps the maintainability of both pre-existing new vehicles.

Armored encapsulation 26 is preferably manufactured cylindrically (see FIG. 3*a*) so as to allow the encapsulation of "S" terminal 201, circuit 105, relay 210 and first end 211. Preferably, armored encapsulation 26 is manufactured with one or more openings 102, to facilitate mounting of armored encapsulation 26 on terminals 202 and/or 203, as further detailed hereinunder with reference to FIG. 4*a*.

The present embodiments successfully provide a solution to the problems associated with installation of system 20 in pre-existing vehicles. It is appreciated that the solenoids of different vehicle may differ in the positions of terminals 202 and 203 thereon.

Figure 3B:
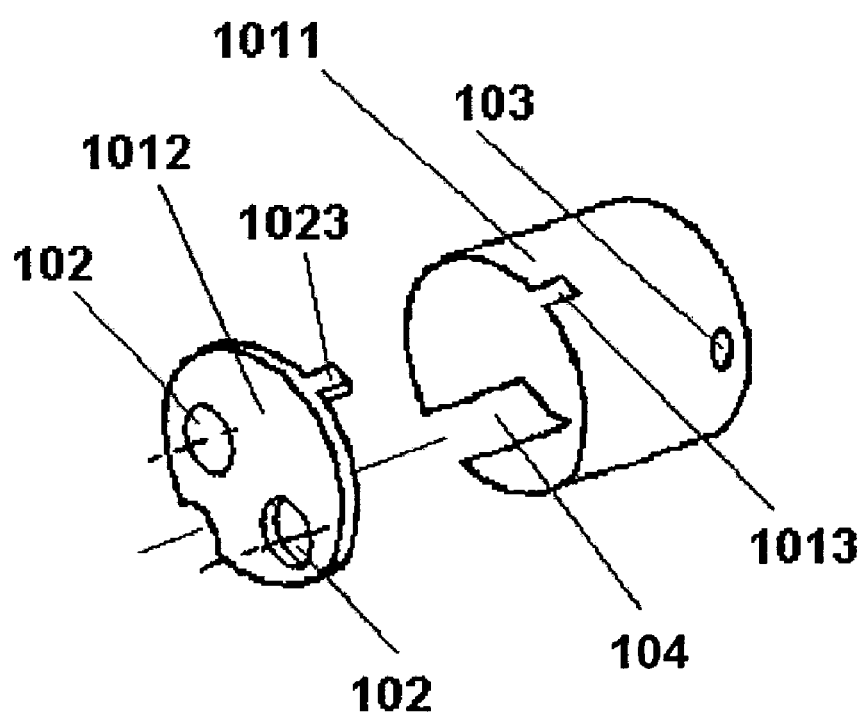
FIG. 3b is a schematic illustration of an armored encapsulation unit having two parts, according to a preferred embodiment of the present invention.

Reference is now made to FIG. 3*b*, which is a schematic illustration of an alternative design of armored encapsulation 26, according to a preferred embodiment of the present invention. In this embodiment, armored encapsulation 26 comprises a first part 1011 and a second part 1012, second part 1012 serves as a base for first part 1011, so that a relative orientation between first 1011 and second 1012 part may vary, depending on the type of solenoid 1.

A preferred shape of armored encapsulation 26 is, as stated, a cylinder, so as to match the shape of solenoid 1. It happens to be that the physical separation between terminals 202 and 203, and the diameters of solenoid 1, terminal 202 and terminal 203 are typically uniform for most existing vehicles of the same manufacturer, and often even between different manufacturers. On the other hand, the orientation of terminals 202 and 203 relatively to starter motor 2 is different from one vehicle type to the other.

Thus, for a cylindrical armored encapsulation 26, second part 1012 preferably shaped as a disk, having openings 102 through which terminals 202 and 203 can protrude. The installer can rotate second part 1012 relatively to first part 1013 until the relative orientation between first 1013 and second 1012 parts matches the relative orientation between terminals 202 and 203 and starter motor 2. Several sizes of armored encapsulation 26 may be manufactured, so that armored encapsulation 26 is also compatible with non-standard diameters of solenoid 1 and/or terminals 202 and 203.

A skilled artisan would appreciate that the presently preferred embodiment of the invention, in which armored encapsulation 26 is composed of two parts, eases the installation of system 20 on most existing vehicles without reducing the level of protection to solenoid 1 provided by armored encapsulation 26.

Second part 1012 is manufactured compatible with first part 1011 so that once first part 1011 is covered by second part 1012, armored encapsulation 26 is essentially a complete, unopenable, unit. The compatibility between first 1011 and second 1012 parts may be achieved, for example, by manufacturing armored encapsulation 26 with at least one positioning pairs such as, but not limited to, a pin 1023 (say, on second part 1012) and a compatible groove 1013 (say, on first part 1011). The number of positioning pairs determines the number of predetermined angles at which second part 1012 may be rotated relative to first part 1013. Alternatively, the compatibility between first 1011 and second 1012 parts may be achieved by gluing, welding, joining by pressing or using any other known method to attach second part 1012 to first part 1011, once correctly positioned.

According to a preferred embodiment of the present invention first part 1013 may comprise an additional opening 104 to accommodate close-fit installations in cases where solenoid 1 is close to or touches the starter motor 2.

The cylindrical shape of armored encapsulation 26 shown in FIG. 3 is further advantageous in that it makes it more difficult to grip by a tool. Thus, armored encapsulation 26 either remains closed or the level of control by the thief is reduced, inflicting irreversible damage and making it difficult for him to use skill in order to overcome the system. In the latter case "S" terminal 201 (or any other appropriate terminal, such as, but not limited to, "B" terminal 202 or "M" terminal 203) is substantially damaged thereby rendering solenoid 1 useless.

Figure 4A:
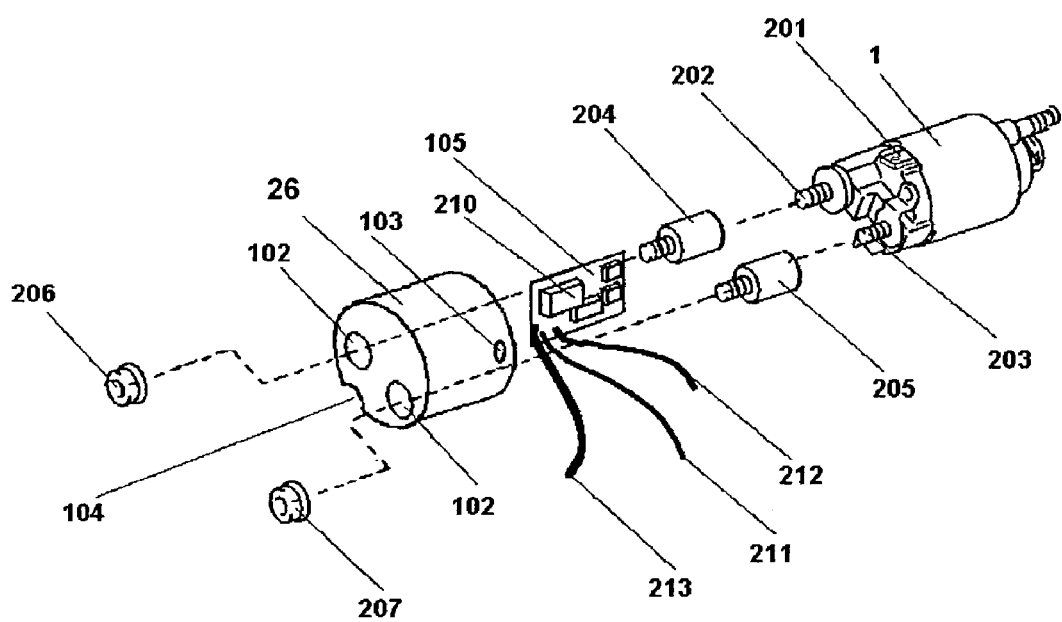
FIG. 4a shows relative locations and connection between the various parts of the system and the solenoid, according to a preferred embodiment of the present invention.
Figure 4B:
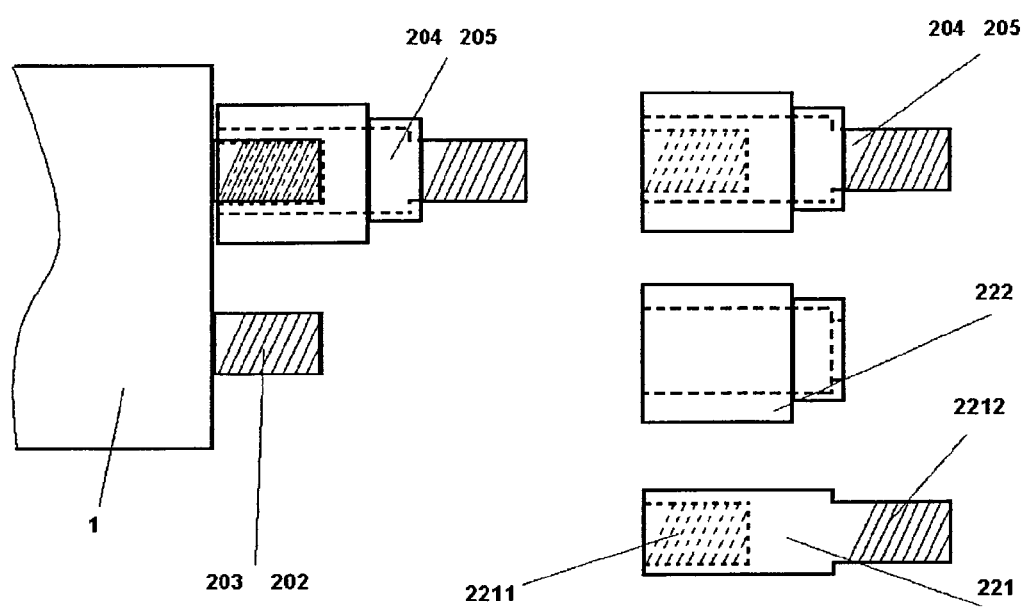
FIG. 4b is a schematic illustration of elongators which are used according to a preferred embodiment of the present invention.

FIG. 4*a–b* is a more detailed illustration of system 20 and solenoid 1. In particular, FIG. 4*a–b* shows relative locations and connection between the various parts of system 20 and solenoid 1, according to a preferred embodiment of the present invention. One or more elongators are used to define an inner volume for circuit 105 so as to avoid electric shortcuts, while maintaining compatibility with the original wiring of the vehicle.

Two such elongators are shown in FIGS. 4*a–b*, designated as elongator 204 and elongator 205. The elongators (e.g., elongators 204 and 205) are preferably sizewise compatible with circuit 105 and, in addition, geometrically compatible with terminals 202 and 203 of solenoid 1, so that circuit 105, the elongators, terminals 202/203 and armored encapsulation 26 form a substantially compact assembly.

With reference to FIG. 4b, the elongators are preferably manufactured with an internal thread 2211, designed to be compatible with terminals 202 and 203 of solenoid 1, and an external thread 2212, designed to match the original power wires such as power line 711 and nuts and at least one security nut (e.g., two security nuts, designated 206 and 207), as further detailed hereinafter. In case terminals 202 and 203 are differently shaped, internal thread 2211 is shaped in accordance with its respective terminal. Elongators 204 and 205 are preferably made of a combination of a conductive part 221 and an insulating part 222. Conductive part 221 is preferably adjacent to thread 2211 whereas insulating part 222 is preferably on the other side of elongators 204 and 205. Insulating part 222 serves for avoiding electrical contact between armored encapsulation 26 and conductive parts 221 and/or terminals 202 and 203. Preferably, conducting part 221 is shaped to correspond to its respective terminal (202 or 203) so as to facilitate the connection of the original vehicle electric contacts (not shown) to elongators 204 and 205 without the need for further modification of integral parts of the vehicle.

Openings 102 of armored encapsulation 26 (see also FIG. 3*a–b*) preferably match the size and shape of elongators 204 and 205. Preferably, armored encapsulation 26 is manufactured with an additional opening 103 (see also FIG. 3*b*) through which wires 211 and 213 (or RF antenna) can be routed. According to a preferred embodiment of the present invention, opening 103 is so located on armored encapsulation 26 so as to prevent any access to circuit 105 through opening 103.

Security nuts 206 and 207 are used to fix armored encapsulation 26 into position, so as to prevent future attempts at removal. One way of achieving such an effect is to select as security nuts 206 and 207 of a kind which cannot be reopened once screwed onto elongators 204 and 205.

Figures 4C, 4D:
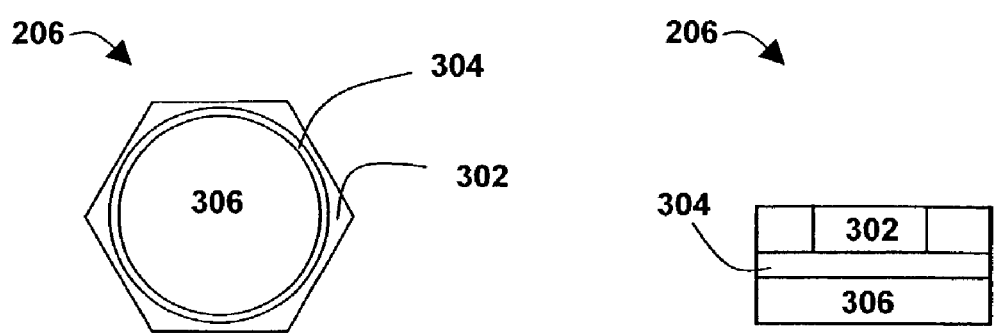
FIGS. 4c–d are schematic illustrations of security nuts, according to a preferred embodiment of the present invention.

FIGS. 4*c–d* are schematic illustrations of security nuts 206 and 207, according to a preferred embodiment of the present invention. Each one of security nuts 206 and 207 may comprise three parts: a first part 302, designed as a regular shell of a screw nut, so as to withstand a predetermined maximal tightening force; a second part 304, designed to withstand predetermined maximal shear forces; and a third part 306 designed to prevent reopening using a conventional opening tool. First 302 second 304 and third 306 parts are preferably concentric and may be arranged either radially (FIG. 4*c*) or axially (FIG. 4*d*).

First part 302 serves for allowing the respective security nut to be mounted, and tightened, in one embodiment using a conventional tool, and in another embodiment using a special tool. Second part 304 is preferably manufactured sufficiently thin so that a shear force higher than the predetermined maximal shear forces results in breaking of second part 304 and detachment of first part 302 therefrom. Third part 306 is the part that remains on elongator 204 and 205. Preferably, third part 306 is essentially round (e.g., spherical, cylindrical, conical) and is sufficiently small so that a conventional tool slips off upon a reopening attempt.

Thus, once armored encapsulation 26 is positioned so that threads 2212 protrude through openings 102, security nuts 206 and 207 are tightened thereon. Then, the installer ensures that the system operates and properly mounted and tightens security nuts 206 and 207 forcibly, exceeding the maximal tightening force. The high shear force resultant in breaking of second part 304 and detachment of the first part 302 from the third part 306, thereby preventing reopening of armored encapsulation 26.

According to a preferred embodiment of the present invention, security nuts 206 and 207 may be shaped so that the installation is not completed until first part 302 is detached from third part 306, thereby ensuring a correct installation procedure. This may be achieved, for example, by selecting the combined longitudinal dimension of first part 302 and second part 304, so that security nuts 206 and 207 encapsulate external thread 2212 of elongators 204 and 205. Alternatively, external thread 2212 may be integrated with third part 306, which thus can be is accessible only after first 302 and second 304 have been detached. In this alternative, elongators 204 and 205 matches the security nuts, but not the size required for installation of the electric wires.

As stated, external thread 2212 is designed to match the original power wires (e.g. line 711) and nuts of the vehicle, hence, the temporarily encapsulation of external thread 2212 causes malfunctioning in the system or the solenoid. Only once the installer applies the required force and breaks second part 304 thread 2212 is revealed and the installation procedure can be continued (e.g., by re-connecting the original wires of the vehicles thereto).

Figure 5:
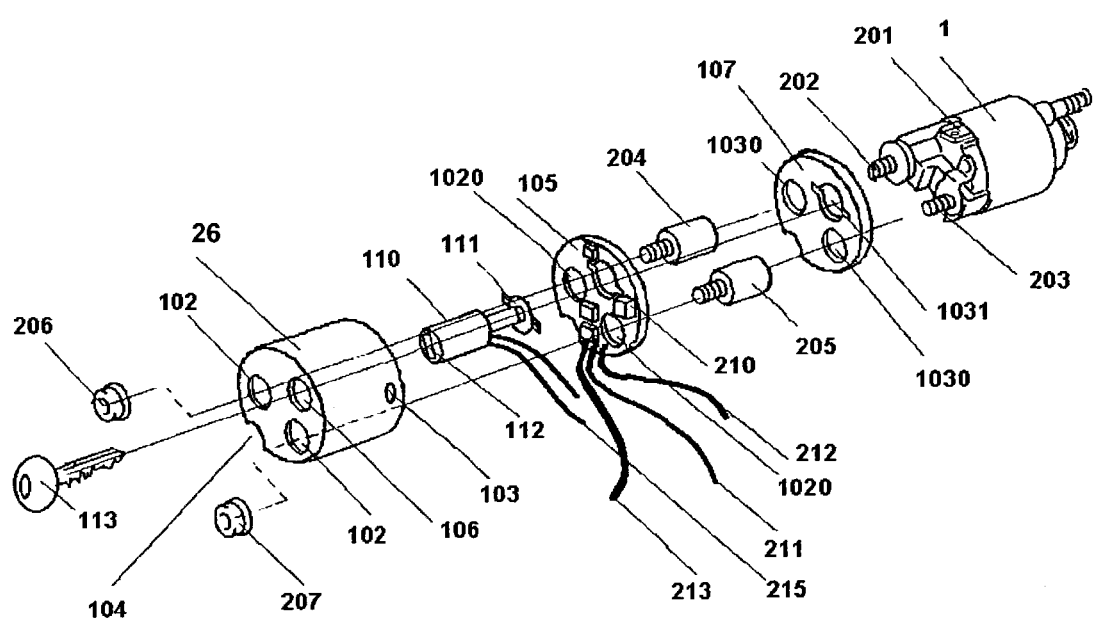
FIG. 5 shows relative locations and connection between the various parts of the system and the solenoid, together with a locking device, which may be used according to a preferred embodiment of the present invention.

Reference is now to FIG. 5, which is a more detailed illustration of system 20 and solenoid 1, according to a preferred embodiment of the present invention, in which system 20 further comprises a locking device 110, for allowing reopening of armored encapsulation 26 by an authorized person, e.g., for maintains or repair purposes. Locking device 110 may be any known locking device, for example, a key-based lock cylinder having a keyhole 112 or a password-based electrical locking device. The advantage of this embodiment is that the authorized person can access the interior of armored encapsulation 26 without the need for destructive actions. In this embodiment, armored encapsulation 26 is preferably formed with an additional opening 106, designed to match the inner shape of locking device 110 and to facilitate opening and closing of locking device 110, e.g., by entering a pre-programmed password or by using a key 113 designed compatible to keyhole 112.

Specifically, according to one embodiment, when locking device 110 is in a predetermined position, a locking element 111, connected to locking device 110, engages a lock hole 1031 positioned in a mounting plate 107, and thereby mounts armored encapsulation 26 to solenoid 1. Mounting plate 107 may be connected to the terminals 202 and 203, to elongators 204 and 205 or to the body of solenoid 1. Mounting plate 107 is preferably manufactured with two holes 1030 each compatible with one of elongators 204 and 205. Alternatively, circuit 105 may serve as mounting plate 107. In this alternative, lock hole 1031 is preferably formed in circuit 105. The advantage of using circuit 105 as the mounting plate is that if locking device 110 is forcibly attacked circuit 105 is damaged beyond immediate repair.

The present embodiments successfully address the rare possibility of system failure and provide an optional bypassing procedure to allow starting of the vehicle, e.g., in case of emergency or malfunction of user interface device 28. Hence, according to a preferred embodiment of the present invention, locking device 110 may also serve for bypassing control apparatus 22. For example, an additional electrical wire may be routed from an electrical switch controlled by locking device 110 to first end 212 (see FIGS. 2a–b). Thus, locking device 110 may be used (e.g., using key 113) to establish contact between first end 211 and second end 212 thereby to bypass circuit 105.

It is to be understood that circuit 105 may be bypassed also in embodiments in which locking device 110 is not included, e.g., using a bypassing device which is connected similarly to locking device 110. In this embodiment, the bypassing device is preferably equipped with an appropriate mechanical or electrical recognition utility, as further detailed hereinabove.

The operation of the starter may also be controlled by positioning control apparatus 22 within solenoid 1, so that the original solenoid housing serves as armored encapsulation 26.

Figure 6:
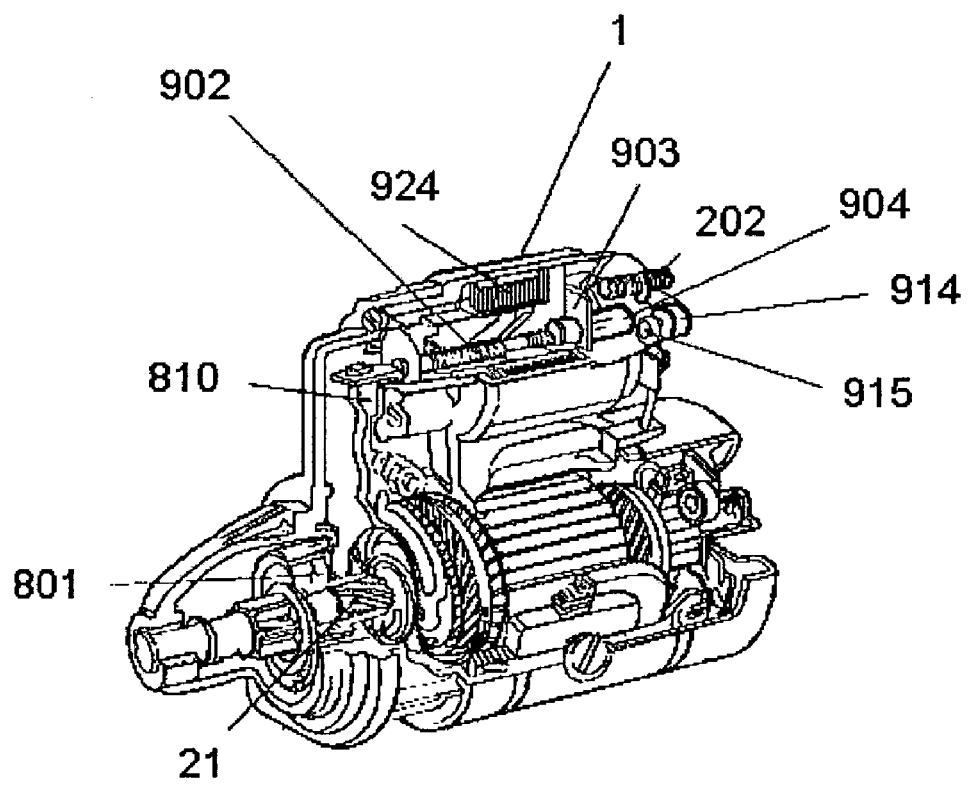
FIG. 6 is a schematic illustration of a complete starter assembly.
Figure 7:
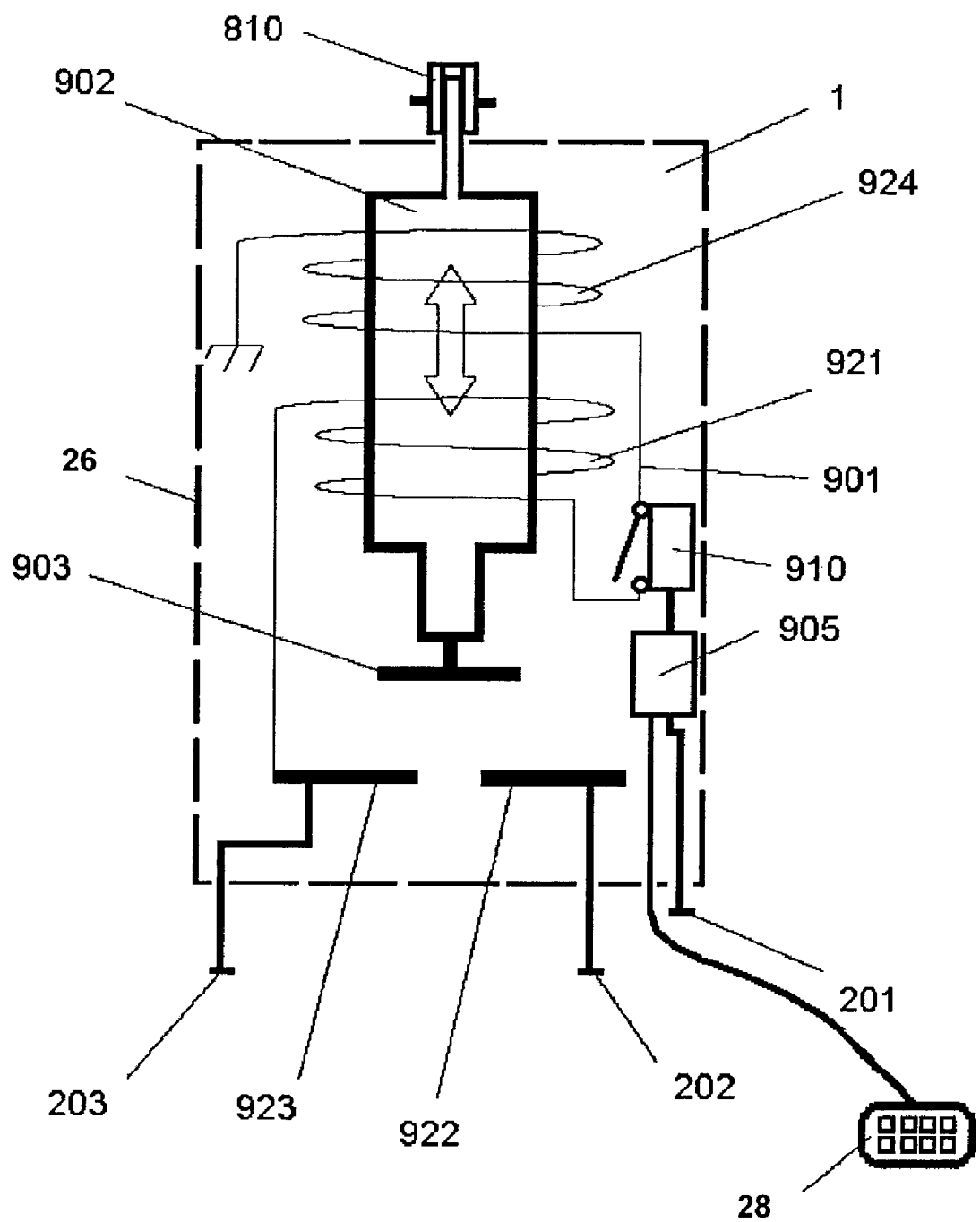
FIG. 7 is a schematic illustration of the interior portion of a solenoid in which an internal plunger is controlled electrically, according to a preferred embodiment of the present invention.

Reference is now made to FIG. 6 and FIG. 7, which are schematic illustrations of the complete starter assembly (FIG. 6) and of the interior portion of solenoid 1 (FIG. 7). In principle, the operation of solenoid 1 is as follows. An internal plunger 902 is wound by two wires, a "hold-in" wire 924 and a "pull-in wire" 921. Wire 924 (the "hold-in" wire) serves for holding internal plunger 902 in its position when the starter assembly is not in use. Internal plunger 902 is manufactured with a contact 903 which serves for closing an electrical circuit between "M" terminal 203 and "B" terminal 202, when the starter assembly is in operation mode. Specifically, when an electric current flows through wire 921 (the "pull-in" wire), magnetic forces, generated in the volume defined by the windings of wire 921, pull internal plunger 902 to establish an electrical contact between an internal contact 923 of "M" terminal 203 and an internal contact 922 of "B" terminal 202. The electrical connection between "M" terminal 203 and "B" terminal 202 allows high electric current to flow to motor 2, which starts to rotate. While moving towards contact 922 and 923, internal plunger 902 pulls a mechanical shift lever 810 connected to shaft 21 via a clutch device 801. Thus, simultaneously with the rotation of motor 2, shaft 21 engages the engine shaft of the vehicle (not shown) generating the initial compression required for ignition or cranking thereof.

According to a preferred embodiment of the present invention control apparatus 22 is designed and constructed to control motion of lever 810 so that when system 20 is operative the engagement between shaft 21 and the engine's shaft is prevented. Alternatively, control apparatus 22 may be designed and constructed to control motion of an internal plunger 902 of solenoid 1. It will be appreciated that when internal plunger 902 is disabled, lever 810 and shaft 21 are also immobilized and therefore, even if a thief successfully interconnects terminals 202 and 203 (e.g., by an external current bridge), no initial ignition/cranking can occur. The control of the motion of internal plunger 902 may be done either mechanically or electrically, as further explained hereinbelow.

Hence, in one embodiment, control apparatus 22 comprises an electrical switch 910 which controls electrical signals transmitted through wire 921 and/or wire 924. In this embodiment, the motion of internal plunger 902 is prevented either by keeping the current flowing through wire 924 (the "hold-in" wire) thereby holding internal plunger 902 in its non-operative position, or by preventing current from flowing through wire 921 (the "pull-in" wire) thereby preventing the generation of magnetic forces in the direction of contact 922 and 923.

Thus, control apparatus 22 preferably comprises an electronic circuit 905 controlling a switch 910 positioned on a wire 901 connecting wire 921 and/or wire 924. Circuit 905 may also be in communication with user interface device 28, so as to allow the authorized user to activate or deactivate control apparatus 22 as described hereinabove.

Figure 8:
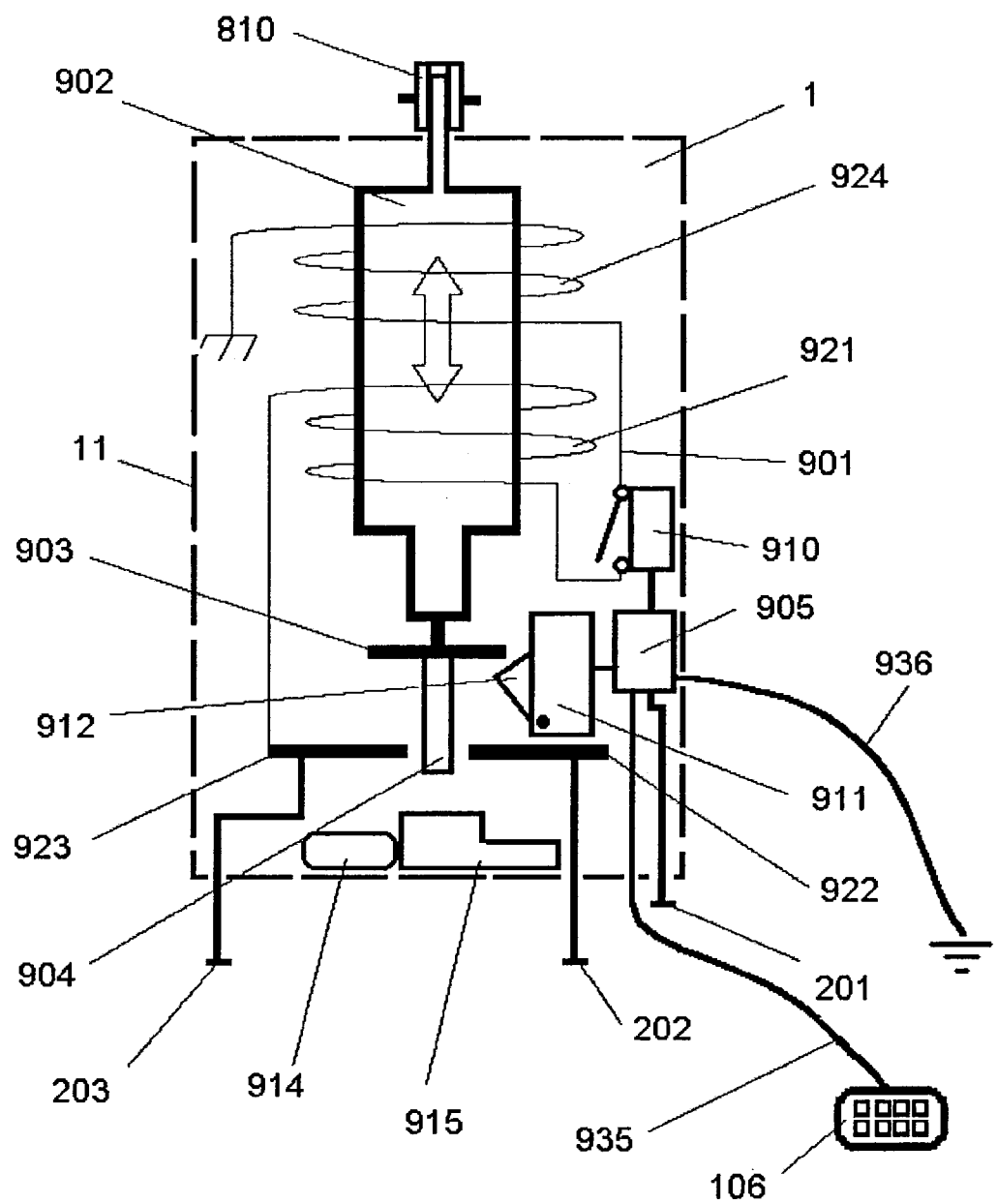
FIG. 8 is a schematic illustration of the interior portion of a solenoid in which an internal plunger is controlled mechanically, according to a preferred embodiment of the present invention.

Reference is now made to FIG. 8, which is a schematic illustration of the interior portion of solenoid 1 and system 20 in another embodiment in which a mechanical actuator 911 is used for controlling the motion of internal plunger 902. Hence, one alternative of this embodiment may be, for example, the use of a mechanical actuator 911 manufactured with a mechanical stopper 912, (e.g., a pin or a lever). Thus, control apparatus 22 preferably comprises mechanical actuator 911, mechanical stopper 912 and electronic circuit 905. In use, mechanical actuator 911 is controlled by electronic circuit 905 so that when the authorized user chooses to activate control apparatus 22, mechanical actuator 911 and stopper 912 limit the motion of internal plunger 902, thereby preventing the initial ignition/cranking of the engine by an unauthorized user.

Another alternative for mechanical control of the motion of internal plunger 902 may be the use of an elongation rod 904 connected to internal plunger 902 and a compatible blocking mechanism 915. According to a preferred embodiment of the present invention elongation rod 904 and its compatible blocking mechanism 915 are designed and constructed so as to selectively limit the motion of internal plunger 902. This may be done, for example, by selecting blocking mechanism 915 to have asymmetric height or width, so that the position and/or orientation of blocking mechanism 915 determines the nature (e.g., the amplitude) of motion of internal plunger 902. Specifically, when blocking mechanism 915 is in one position (say, "right" position, see FIG. 8), the motion of internal plunger 902 is limited and when blocking mechanism 915 is in another position ("left" position) the motion of internal plunger 902 is allowed. Other positions and/or orientations of blocking mechanism 915 are also not excluded from the scope of the present invention.

When the motion of internal plunger 902 is limited, no electrical contact is established between contacts 903, 923 and 922 and no ignition/cranking occurs. The change in position/orientation of blocking mechanism 915 may be achieved, for example, by a mechanical actuator 914 which, similarly to actuator 911, may be controlled, e.g., by electronic circuit 905. Additionally, and preferably, circuit 905 may be in communication with user interface device 28, as further detailed hereinabove.

The optional bypassing procedure mentioned hereinabove may also be employed in the embodiments in which the control apparatus limits the motion of internal plunger 902 or lever 810. Hence, according to a preferred embodiment of the present invention the bypassing device (which, as stated, may be realized by locking device 110) may disable any of the above mechanisms which limit the motion of internal plunger 902 or lever 810 (e.g., switch 910 mechanical actuator 911 or blocking mechanism 915).

As stated, essential module 24 may be any of the vehicle systems which is essential for the mobilization of the vehicle. According to a preferred embodiment of the present invention the essential module may be power-supply unit 4. In this embodiment, control apparatus 22 is designed and constructed so as to control the voltage of power-supply unit 4. It is appreciated, that a complete disablement of power-supply unit 4 may harm systems in the vehicle, such as emergency sub-systems logic processors memory units and the like. Thus, according to a preferred embodiment of the present invention, the number of disabled electrolytic cells is selected so as to prevent initial ignition or cranking of the engine on the one hand, while maintaining sufficient power for all other electrical functions on the other hand.

Figure 9A:
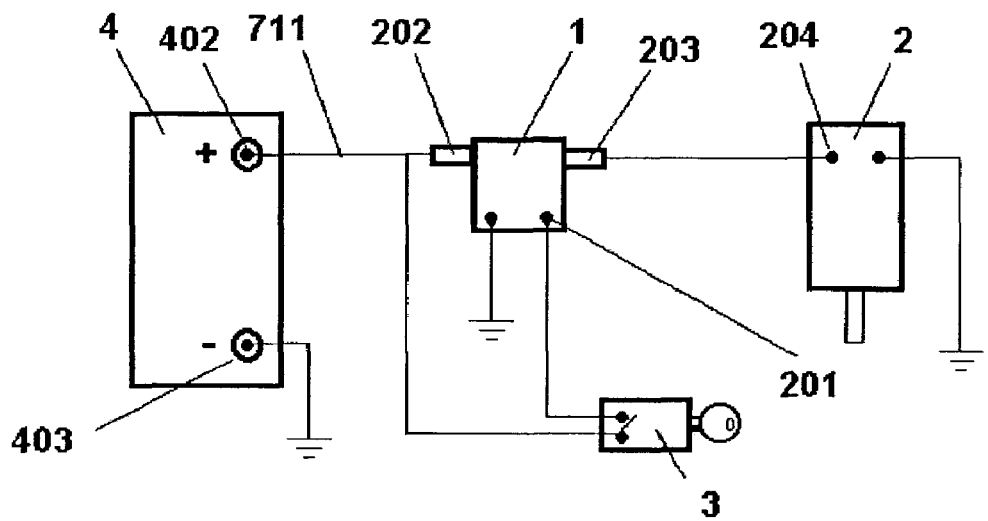
FIGS. 9a–c are schematic illustrations of the system in which a power-supply unit of the vehicle is electrically controlled, according to a preferred embodiment of the present invention.
Figure 9B:
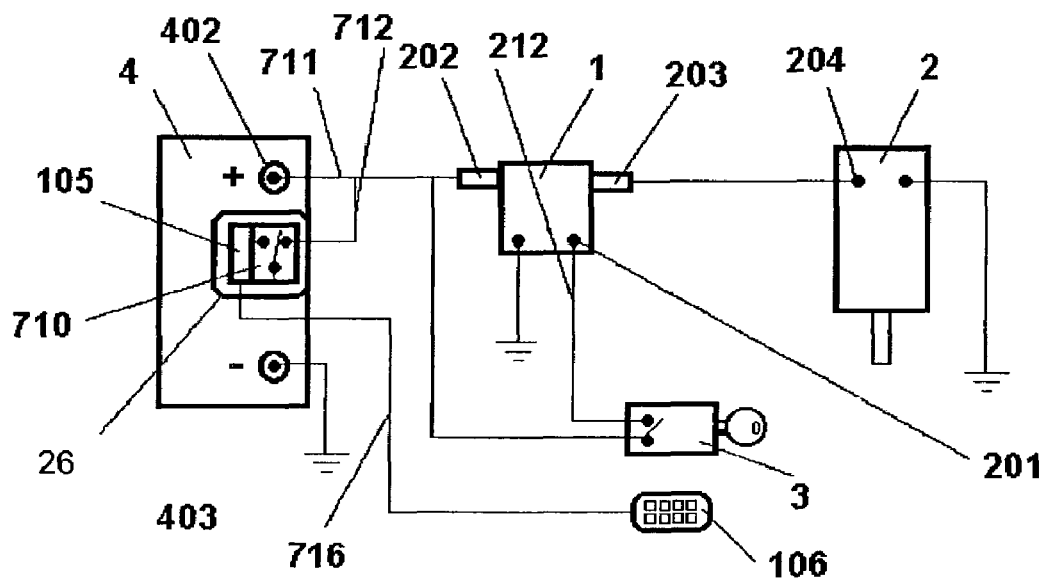
Figure 9C:
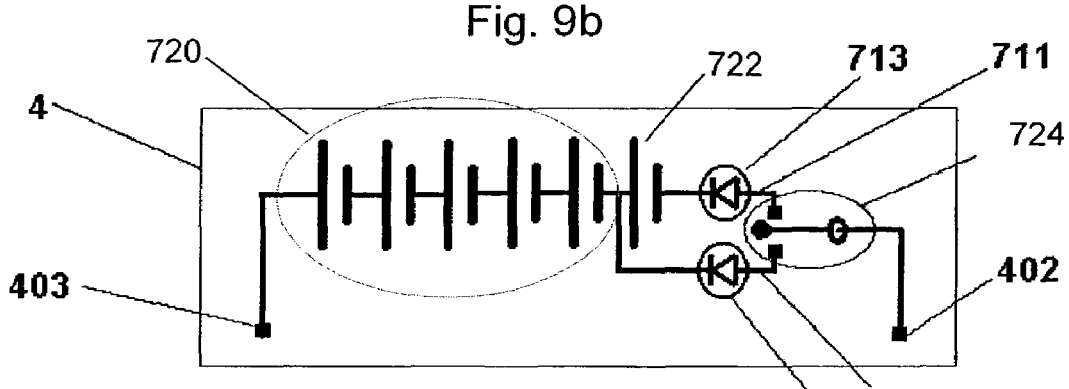

Reference is now made to FIGS. 9a–c, which are schematic illustrations of system 20 in the preferred embodiment in which control apparatus 22 controls power-supply unit 4. Referring to FIG. 9a, in a typical ignition circuit, power-supply unit 4 has a grounded terminal 403 and a "B" terminal 402 of power-supply unit 4 which is connected via a power line 711 to "B" terminal 202 of solenoid 1. Power line 711 is controlled by ignition switch 3. The potential difference between terminal 403 and terminal 402 is typically about 12, 24 or 42 volts, depending on the type of the vehicle, but other voltage values are not excluded.

As used herein the term "about" refers to ±10%.

Referring to FIG. 9b, according to a preferred embodiment of the present invention control apparatus 22 comprises a bypassing circuit 710 which bypasses a selective number of electrolytic cells of power-supply unit 4. Bypassing circuit 710 is preferably controlled by circuit 105, which, in common with the other embodiments, preferably communicates with user interface device 28.

The interior of power-supply unit 4 and bypassing circuit 710 are better illustrated in FIG. 9c. For simplicity, FIG. 9c shows six electrolytic cells of power-supply unit 4. However, the presently preferred embodiment may be applied on any number of electrolytic cells. Hence, of the six electrolytic cells, one electrolytic cell, designated 722, is bypassed while the remaining five electrolytic cells, designated 720, are not bypassed. Cell 722 is preferably bypassed by a semiconductor component, e.g., a diode 713 so as not to cause damage to power-supply unit 4. Bypassing circuit 710 comprises a relay 724 which toggles between a state in which cell 722 is bypassed and a state in which cell 722 is not bypassed. Bypassing circuit 710 may be either connected directly to terminal 402, or, alternatively, an additional wire 712 may be connected to power line 711. In any case, once cell 722 is bypassed, the voltage of power-supply unit 4 drops by the ratio between the number of bypassed cells to the total number of cells (about 17% in the example of FIG. 9c). If, for example, the regular voltage of power-supply 4 is 12 volt, in a bypassing state the voltage drops to about 10 volts. Such reduced voltage is sufficient for retaining the functionality of most electronic sub-systems, but does not provide sufficient power to operate the starter motor.

It is to be understood that the above description is for illustrative purpose and that the present embodiment can be applied with suitable adaptation to other kinds of power-supply unit. For example, the automotive vehicle industry has recently shown a tendency to move from a complex electrical sub-system to a simpler and more efficient power-net topology based on 36–42 volt nominal voltages distributed from central bus bars. As the different nominal voltage systems are expected to display similar electrical behavior as the traditional legacy systems, the present embodiment can be employed also on these systems, using proportionally higher voltage levels. Other power-supply units are based on super capacitors. The present embodiment can be employed on these systems, e.g., using two capacitors parallel, where one of which is selectively disconnected while the other continues to supply minimal power.

Figure 10:
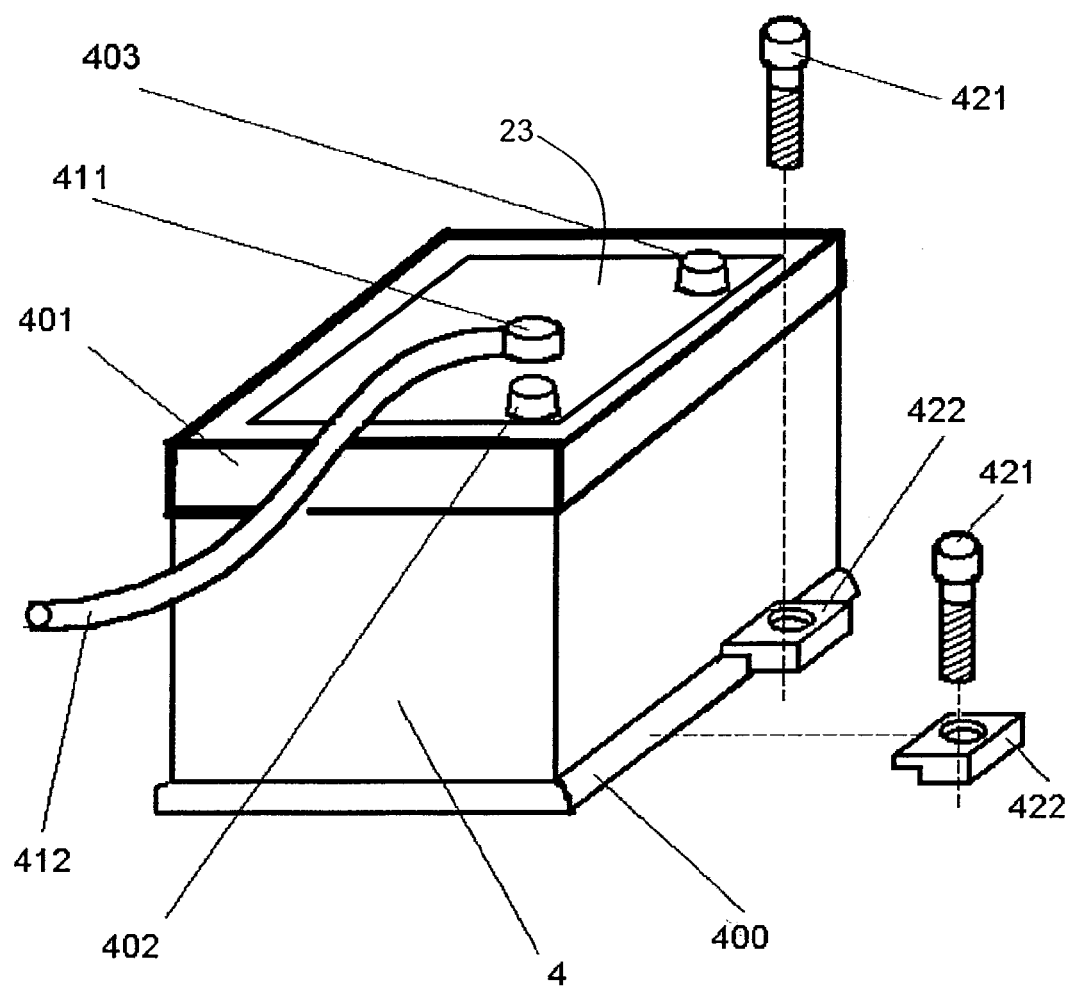
FIG. 10 is a schematic illustration of the power-supply unit and various protections thereof, according to a preferred embodiment of the present invention.

With reference to FIG. 10, according to a preferred embodiment of the present invention power line 711 may be externally protected, e.g., by an armored sleeve 412 encapsulating power line 711 and/or an armored cap 411 encapsulating terminal 402. Additionally, as stated, self-destructing assembly 23 may be positioned in the interior of power-supply 4 so that any attempt to open power-supply 4 and bypass control apparatus 22 results in substantial damage beyond immediate repair.

According to another aspect of the present invention there is provided a method of installing a theft-preventing system. The method comprises the following method steps which are illustrated in the flowchart of FIG. 11.

Figure 11:
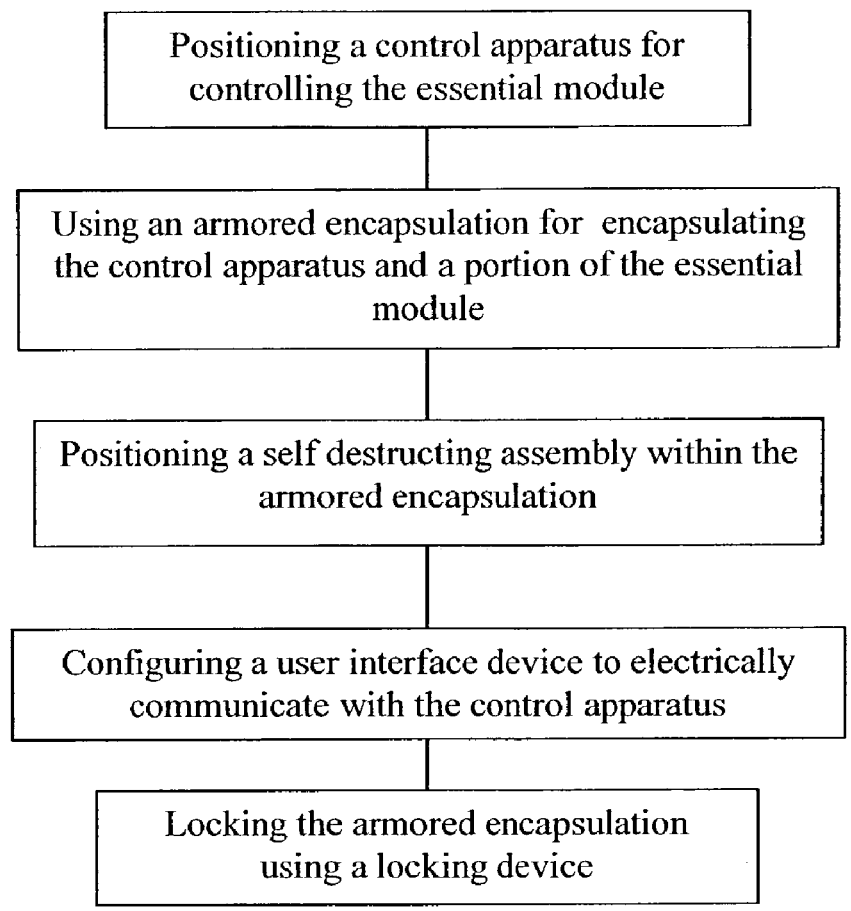
FIG. 11 is a flowchart of a method of installing a theft-preventing system, according to a preferred embodiment of the present invention.

Referring to FIG. 11, in a first step a control apparatus is provided and positioned so as to control operation of the essential module of the vehicle. The control apparatus may be, for example, similar to control apparatus 22. In a second step of the method, the control apparatus is encapsulated using at least one armored encapsulation (e.g., armored encapsulation 26). According to a preferred embodiment of the present invention the method may further comprise an additional step in which a self-destructing assembly is positioned within the armored encapsulation. The self-destructing assembly is arranged so that even if the armored encapsulation is only partially damaged, the self-destructing assembly disintegrates and disables the essential module. The self-destructing assembly may be any assembly which irretrievably disintegrates upon violent action, e.g., self-destructing assembly 23 as described hereinabove.

In addition, the method may further comprise another step in which a user interface device is configured to electrically communicate with the control apparatus, e.g., using a communication device, as further detailed hereinabove.

In addition, the method may comprise a step of locking the armored encapsulation using a locking device, so as to allow a removal of at least a part of the armored encapsulation solely by an authorized person.

Figure 12:
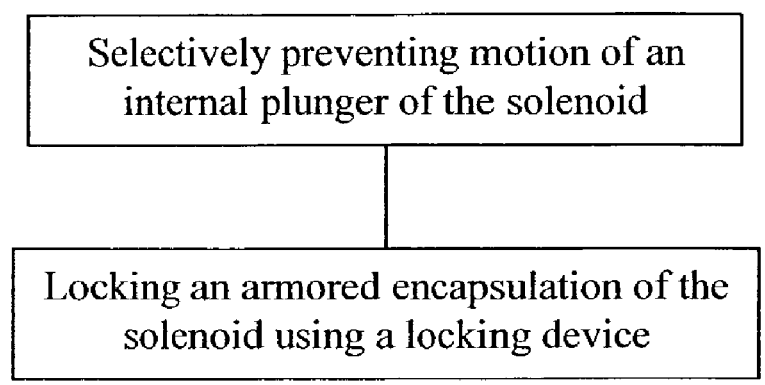
FIG. 12 is a flowchart of a method of preventing theft of a vehicle, according to a preferred embodiment of the present invention.

FIG. 12 is a flowchart of a method of preventing theft of a vehicle according to an additional aspect of the present invention. The method comprises selectively preventing motion of an internal plunger of the solenoid, thereby preventing initial ignition of the vehicle. As stated, the motion of the internal plunger is essential for starting the vehicle. Thus, upon a legitimate starting of the vehicle (e.g., using an ignition key, a valid code, etc.), the motion of the internal plunger is allowed so that shaft 21 engages a compatible shaft in the vehicle's engine (see FIG. 3). On the other hand, under circumstances interpreted as suspicious, the motion of the internal plunger is prevented, electrically or mechanically, as further detailed hereinabove. The allowance or disallowance of the motion of the internal plunger may be achieved, for example, using a user interface device (e.g., user interface device 28). In addition, according to a preferred embodiment of the present invention, the motion of the internal plunger may be irreparably disabled, if an attempt is made to attack the system.

Similarly to the above method, this method may comprise an optional step in which an armored encapsulation of the solenoid is locked using a locking device, so as to allow a removal of at least a part of the armored encapsulation solely by an authorized person.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for preventing theft of a vehicle having at least one essential module being essential to mobilization of the vehicle, the system comprising:
   a control apparatus for controlling operation of the at least one essential module;
   at least one armored encapsulation, encapsulating said control apparatus and at least a portion of the at least one essential module; and
   a self-destructing assembly positioned within said at least one armored encapsulation, said self-destructing assembly being designed and constructed so that if said at least one armored encapsulation is at least partially damaged, said self-destructing assembly disintegrates, hence providing said damaging of the at least one essential module;
   wherein at least one of a shape, configuration, material, size and location of said at least one armored encapsulation within the vehicle is selected so as to prevent accessing said control apparatus without substantially damaging said at least one armored encapsulation and the at least one essential module, thereby preventing the mobilization of the vehicle.

2. The system of claim 1, wherein the at least one essential module is selected from the group consisting of a starter, an integrated starter-alternator device, a dynostart device, a starter-generator, a power-supply unit, a hand brake, a gearshift selector and an electric part of a hybrid-powered vehicle.

3. The system of claim 1, wherein said armored encapsulation being at least partially damaged is selected from the group consisting of said armored encapsulation being at least partially bended, said armored encapsulation being at least partially twisted, said armored encapsulation being at least partially strained, said armored encapsulation being at least partially opened and said armored encapsulation being at least partially broken.

4. The system of claim 1, wherein said self-destructing assembly comprises a conducting foil.

5. The system of claim 1, wherein said at least one armored encapsulation is designed and constructed so as to prevent heating of said control apparatus.

6. The system of claim 1, wherein said at least one armored encapsulation comprises a material characterized by low heat capacity.

7. The system of claim 1, wherein said at least one armored encapsulation comprises at least one reflective layer capable of reflecting heat radiation therefrom.

8. The system of claim 1, wherein said at least one armored encapsulation comprises at least two layers separated by a medium capable of preventing heat convection.

9. The system of claim 1, wherein a body of said at least one armored encapsulation is selected from the group consisting of a shell body and a solid body.

10. The system of claim 1, wherein said control apparatus and said at least said portion of the at least one essential module are each independently integrated in said solid body of said at least one armored encapsulation.

11. The system of claim 1, wherein said at least one armored encapsulation comprises a first part, and a second part being geometrically compatible with said first part, said first and said second parts being rotatable to a plurality of angles.

12. The system of claim 11, wherein said at least one armored encapsulation comprises a plurality of positioning pairs, each corresponding to one angle of said plurality of angles.

13. The system of claim 12, wherein said plurality of positioning pairs comprise at least one pin-groove pair.

14. The system of claim 1, further comprising a heat isolating interface, positioned between said at least one armored encapsulation and an engine bay of the vehicle, for preventing heat transfer from said engine to said at least one armored encapsulation.

15. The system of claim 1, wherein said control apparatus comprises at least one electronic circuit assembly being formed in a dielectric material selected to withstand any one of high temperature, moisture, electrical sparks, mechanical vibrations and chemical vapors.

16. The system of claim 1, further comprising a user interface device, electrically communicating with said control apparatus, said user interface device being designed and constructed for activating and deactivating said control apparatus.

17. The system of claim 16, wherein said user interface device comprises recognition circuitry for recognizing a user prior to said activating and deactivating.

18. The system of claim 17, wherein said recognition circuitry is selected from the group consisting of keyed-in password recognition circuitry, spoken password recognition circuitry, biometric voice recognition circuitry, biometric fingerprint recognition circuitry, biometric bone structure recognition circuitry and biometric iris-patterns recognition circuitry.

19. The system of claim 1, further comprising a communication device, being able to communicate with a remote control center, said communication device being operable to transmit signals to said remote control center and receive responses, if said at least one armored encapsulation is at least partially damaged, thereby to apply activation or deactivation commands to said control apparatus.

20. The system of claim 1, further comprising at least one locking device for allowing a removal of at least a portion of said at least one armored encapsulation by a predetermined procedure, without causing damage to said at least one armored encapsulation.

21. The system of claim 20, wherein said at least one locking device is selected from the group consisting of a key-based locking device and a password-based locking device.

22. The system of claim 20, wherein said at least one locking device comprises an electrical switch connected to the at least one essential module so that if said predetermined procedure is executed, said control apparatus is bypassed.

23. The system of claim 1, further comprising a bypassing device for bypassing said control apparatus by a predetermined procedure.

24. The system of claim 23, wherein said bypassing device comprises an electrical switch connected to the at least one essential module so that if said predetermined procedure is executed, said control apparatus is bypassed.

25. The system of claim 1, wherein said control apparatus is designed and constructed so as to control motion of an internal plunger of a starter solenoid of the vehicle, thereby to indirectly prevent a starter motor of the vehicle from rotating an engine of the vehicle.

26. The system of claim 25, wherein said control apparatus comprises an electrical switch operable to control electrical signals transmitted through a wire winding said internal plunger, so that when said electrical signals are transmitted, said motion of said internal plunger is allowed, and when said electrical signals are terminated, said motion of said internal plunger is disabled.

27. The system of claim 25, wherein said control apparatus comprises a mechanical actuator operable to limit said motion of said internal plunger.

28. The system of claim 27, further comprising a bypassing device for bypassing said control apparatus by a predetermined procedure.

29. The system of claim 25, wherein said bypassing device is operable to disable said mechanical actuator in such a manner that said motion of said internal plunger is allowed.

30. The system of claim 25, wherein said control apparatus comprises an elongation rod, connected to said internal plunger, and a blocking mechanism, compatible with said elongation rod and positioned opposite thereto, said blocking mechanism and said elongation rod being designed and constructed so as to selectively limit said motion of said internal plunger.

31. The system of claim 30, further comprising a bypassing device for bypassing said control apparatus by a predetermined procedure.

32. The system of claim 31, wherein said bypassing device is operable to disable said blocking mechanism in such a manner that said motion of said internal plunger is allowed.

33. A system for preventing theft of a vehicle having at least one essential module being essential to mobilization of the vehicle, the system comprising:
  a control apparatus for controlling operation of the at least one essential module; and
  at least one armored encapsulation, encapsulating said control apparatus and at least a portion of the at least one essential module,
  said at least one armored encapsulation is designed to be locatable within an engine bay of the vehicle;
  wherein at least one of a shape, configuration, material, size and location of said at least one armored encapsulation within the vehicle is selected so as to prevent accessing said control apparatus without substantially damaging said at least one armored encapsulation and the at least one essential module, thereby preventing the mobilization of the vehicle.

34. The system of claim 33, wherein said at least one armored encapsulation is designed to be sufficiently small so as to allow ventilation within said engine bay.

35. The system of claim 33, wherein the at least one essential module is selected from the group consisting of a starter, an integrated starter-alternator device, a dynostart device, a starter-generator, a power-supply unit, a hand brake, a gearshift selector and an electric part of a hybrid-powered vehicle.

36. The system of claim 33, wherein said at least one armored encapsulation is designed and constructed so as to prevent heating of said control apparatus.

37. The system of claim 33, wherein said at least one armored encapsulation comprises a material characterized by low heat capacity.

38. The system of claim 33, wherein said at least one armored encapsulation comprises at least one reflective layer capable of reflecting heat radiation therefrom.

39. The system of claim 33, wherein said at least one armored encapsulation comprises at least two layers separated by a medium capable of preventing heat convection.

40. The system of claim 33, wherein a body of said at least one armored encapsulation is selected from the group consisting of a shell body and a solid body.

41. The system of claim 33, wherein said control apparatus and said at least said portion of the at least one essential module are each independently integrated in said solid body of said at least one armored encapsulation.

42. The system of claim 33, wherein said at least one armored encapsulation comprises a first part, and a second part being geometrically compatible with said first part, said first and said second parts being rotatable to a plurality of angles.

43. The system of claim 33, further comprising a heat isolating interface, positioned between said at least one armored encapsulation and an engine bay of the vehicle, for preventing heat transfer from said engine to said at least one armored encapsulation.

44. The system of claim 33, wherein said control apparatus comprises at least one electronic circuit assembly being formed in a dielectric material selected to withstand any one of high temperature, moisture, electrical sparks, mechanical vibrations and chemical vapors.

45. The system of claim 33, further comprising a user interface device, electrically communicating with said control apparatus, said user interface device being designed and constructed for activating and deactivating said control apparatus.

46. The system of claim 33, further comprising a communication device, being able to communicate with a remote control center, said communication device being operable to transmit signals to said remote control center and receive responses, if said at least one armored encapsulation is at least partially damaged, thereby to apply activation or deactivation commands to said control apparatus.

47. The system of claim 33, further comprising at least one locking device for allowing a removal of at least a portion of said at least one armored encapsulation by a predetermined procedure, without causing damage to said at least one armored encapsulation.

48. The system of claim 33, further comprising a bypassing device for bypassing said control apparatus by a predetermined procedure.

49. The system of claim 33, wherein said control apparatus is designed and constructed so as to control motion of an internal plunger of a starter solenoid of the vehicle, thereby to indirectly prevent a starter motor of the vehicle from rotating an engine of the vehicle.

50. A system for preventing theft of a vehicle having at least one essential module being essential to mobilization of the vehicle, the system comprising:
    a control apparatus for controlling operation of the at least one essential module;
    at least one armored encapsulation, encapsulating said control apparatus and at least a portion of the at least one essential module; and
    at least one elongator positioned so as to increase a volume defined in said at least one armored encapsulation, said volume being sufficient for encapsulating said control apparatus;
    wherein at least one of a shape, configuration, material, size and location of said at least one armored encapsulation within the vehicle is selected so as to prevent accessing said control apparatus without substantially damaging said at least one armored encapsulation and the at least one essential module, thereby preventing the mobilization of the vehicle.

51. The system of claim 50, wherein said at least one elongator is sizewise compatible with said control apparatus and geometrically compatible with said at least one existing component of said at least one essential module, so that said control apparatus, said at least one elongator, said at least one existing component and said at least one armored encapsulation form a substantially compact assembly.

52. The system of claim 51, wherein said at least one existing component of the at least one essential module is selected from the group consisting of a nut a bolt and a thread.

53. The system of claim 50, wherein said at least one elongator is constructed and designed for preventing electric contact between said at least one armored encapsulation and said control apparatus.

54. The system of claim 53, wherein said at least one elongator is made of a combination of a conductive material and an insulating material.

55. The system of claim 50, wherein the at least one essential module is selected from the group consisting of a starter, an integrated starter-alternator device, a dynostart device, a starter-generator, a power-supply unit, a hand brake, a gearshift selector and an electric part of a hybrid-powered vehicle.

56. The system of claim 50, wherein said at least one armored encapsulation is designed and constructed so as to prevent heating of said control apparatus.

57. The system of claim 50, wherein said at least one armored encapsulation comprises a material characterized by low heat capacity.

58. The system of claim 50, wherein said at least one armored encapsulation comprises at least one reflective layer capable of reflecting heat radiation therefrom.

59. The system of claim 50, wherein said at least one armored encapsulation comprises at least two layers separated by a medium capable of preventing heat convection.

60. The system of claim 50, wherein a body of said at least one armored encapsulation is selected from the group consisting of a shell body and a solid body.

61. The system of claim 50, wherein said control apparatus and said at least said portion of the at least one essential module are each independently integrated in said solid body of said at least one armored encapsulation.

62. The system of claim 50, wherein said at least one armored encapsulation comprises a first part, and a second part being geometrically compatible with said first part, said first and said second parts being rotatable to a plurality of angles.

63. The system of claim 50, further comprising a heat isolating interface, positioned between said at least one armored encapsulation and an engine bay of the vehicle, for preventing heat transfer from said engine to said at least one armored encapsulation.

64. The system of claim 50, wherein said control apparatus comprises at least one electronic circuit assembly being formed in a dielectric material selected to withstand any one of high temperature, moisture, electrical sparks, mechanical vibrations and chemical vapors.

65. The system of claim 50, further comprising a user interface device, electrically communicating with said control apparatus, said user interface device being designed and constructed for activating and deactivating said control apparatus.

66. The system of claim 50, further comprising a communication device, being able to communicate with a remote control center, said communication device being operable to transmit signals to said remote control center and receive responses, if said at least one armored encapsulation is at least partially damaged, thereby to apply activation or deactivation commands to said control apparatus.

67. The system of claim 50, further comprising at least one locking device for allowing a removal of at least a portion of said at least one armored encapsulation by a predetermined procedure, without causing damage to said at least one armored encapsulation.

68. The system of claim 50, further comprising a bypassing device for bypassing said control apparatus by a predetermined procedure.

69. The system of claim 50, wherein said control apparatus is designed and constructed so as to control motion of an internal plunger of a starter solenoid of the vehicle, thereby to indirectly prevent a starter motor of the vehicle from rotating an engine of the vehicle.

70. A system for preventing theft of a vehicle having at least one essential module being essential to mobilization of the vehicle, the system comprising:
    a control apparatus for controlling operation of the at least one essential module;
    at least one armored encapsulation, encapsulating said control apparatus and at least a portion of the at least one essential module; and
    at least one security nut for fastening said at least one armored encapsulation to a body of the vehicle, said at least one security nut being designed and constructed for preventing removal of said at least one armored encapsulation;

wherein at least one of a shape, configuration, material, size and location of said at least one armored encapsulation within the vehicle is selected so as to prevent accessing said control apparatus without substantially damaging said at least one armored encapsulation and the at least one essential module, thereby preventing the mobilization of the vehicle.

71. The system of claim 70, wherein at least one of said at least one security nut comprises a first part, a second part and a third part, said second part being positioned between said first and said third part and comprises a detachable material so that if a shear force applied onto said first part exceeds a predetermined maximal value, said first part detaches from said third part.

72. The system of claim 71, wherein a shape of said third part is characterized by smooth edges designed so as to prevent opening of said third part, thereby to prevent removal of said at least one armored encapsulation.

73. The system of claim 71, further comprising at least one elongator positioned so as to increase a volume defined in said at least one armored encapsulation, said volume being sufficient for encapsulating said control apparatus.

74. The system of claim 73, wherein said second part and first part have a sufficiently large combined longitudinal dimension so as to encapsulate said at least one elongator.

75. The system of claim 70, wherein the at least one essential module is selected from the group consisting of a starter, an integrated starter-alternator device, a dynostart device, a starter-generator, a power-supply unit, a hand brake, a gearshift selector and an electric part of a hybrid-powered vehicle.

76. The system of claim 70, wherein said at least one armored encapsulation is designed and constructed so as to prevent heating of said control apparatus.

77. The system of claim 70, wherein said at least one armored encapsulation comprises a material characterized by low heat capacity.

78. The system of claim 70, wherein said at least one armored encapsulation comprises at least one reflective layer capable of reflecting heat radiation therefrom.

79. The system of claim 70, wherein said at least one armored encapsulation comprises at least two layers separated by a medium capable of preventing heat convection.

80. The system of claim 70, wherein a body of said at least one armored encapsulation is selected from the group consisting of a shell body and a solid body.

81. The system of claim 70, wherein said control apparatus and said at least said portion of the at least one essential module are each independently integrated in said solid body of said at least one armored encapsulation.

82. The system of claim 70, wherein said at least one armored encapsulation comprises a first part, and a second part being geometrically compatible with said first part, said first and said second parts being rotatable to a plurality of angles.

83. The system of claim 70, further comprising a heat isolating interface, positioned between said at least one armored encapsulation and an engine bay of the vehicle, for preventing heat transfer from said engine to said at least one armored encapsulation.

84. The system of claim 70, wherein said control apparatus comprises at least one electronic circuit assembly being formed in a dielectric material selected to withstand any one of high temperature, moisture, electrical sparks, mechanical vibrations and chemical vapors.

85. The system of claim 70, further comprising a user interface device, electrically communicating with said control apparatus, said user interface device being designed and constructed for activating and deactivating said control apparatus.

86. The system of claim 70, further comprising a communication device, being able to communicate with a remote control center, said communication device being operable to transmit signals to said remote control center and receive responses, if said at least one armored encapsulation is at least partially damaged, thereby to apply activation or deactivation commands to said control apparatus.

87. The system of claim 70, further comprising at least one locking device for allowing a removal of at least a portion of said at least one armored encapsulation by a predetermined procedure, without causing damage to said at least one armored encapsulation.

88. The system of claim 70, further comprising a bypassing device for bypassing said control apparatus by a predetermined procedure.

89. The system of claim 70, wherein said control apparatus is designed and constructed so as to control motion of an internal plunger of a starter solenoid of the vehicle, thereby to indirectly prevent a starter motor of the vehicle from rotating an engine of the vehicle.

90. A system for preventing theft of a vehicle having at least one essential module being essential to mobilization of the vehicle, the system comprising:
a control apparatus for controlling operation of the at least one essential module,
said control apparatus is designed and constructed so as to control electrical signals transmitted through a signal wire connecting an ignition switch of the vehicle and a starter solenoid of the vehicle; and
at least one armored encapsulation, encapsulating said control apparatus and at least a portion of the at least one essential module;
wherein at least one of a shape, configuration, material, size and location of said at least one armored encapsulation within the vehicle is selected so as to prevent accessing said control apparatus without substantially damaging said at least one armored encapsulation and the at least one essential module, thereby preventing the mobilization of the vehicle.

91. The system of claim 90, wherein said control apparatus comprises a relay and an electronic circuit controlling said relay so as to toggle a state of said signal wire from a transmissive state to a non-transmissive state.

92. The system of claim 90, wherein said size of said at least one armored encapsulation is selected to substantially encapsulate said control apparatus and said signal wire.

93. The system of claim 90, wherein the at least one essential module is selected from the group consisting of a starter, an integrated starter-alternator device, a dynostart device, a starter-generator, a power-supply unit, a hand brake, a gearshift selector and an electric part of a hybrid-powered vehicle.

94. The system of claim 90, wherein said at least one armored encapsulation is designed and constructed so as to prevent heating of said control apparatus.

95. The system of claim 90, wherein said at least one armored encapsulation comprises a material characterized by low heat capacity.

96. The system of claim 90, wherein said at least one armored encapsulation comprises at least one reflective layer capable of reflecting heat radiation therefrom.

97. The system of claim 90, wherein said at least one armored encapsulation comprises at least two layers separated by a medium capable of preventing heat convection.

98. The system of claim 90, wherein a body of said at least one armored encapsulation is selected from the group consisting of a shell body and a solid body.

99. The system of claim 90, wherein said control apparatus and said at least said portion of the at least one essential module are each independently integrated in said solid body of said at least one armored encapsulation.

100. The system of claim 90, wherein said at least one armored encapsulation comprises a first part, and a second part being geometrically compatible with said first part, said first and said second parts being rotatable to a plurality of angles.

101. The system of claim 90, further comprising a heat isolating interface, positioned between said at least one armored encapsulation and an engine bay of the vehicle, for preventing heat transfer from said engine to said at least one armored encapsulation.

102. The system of claim 90, wherein said control apparatus comprises at least one electronic circuit assembly being formed in a dielectric material selected to withstand any one of high temperature, moisture, electrical sparks, mechanical vibrations and chemical vapors.

103. The system of claim 90, further comprising a user interface device, electrically communicating with said control apparatus, said user interface device being designed and constructed for activating and deactivating said control apparatus.

104. The system of claim 90, further comprising a communication device, being able to communicate with a remote control center, said communication device being operable to transmit signals to said remote control center and receive responses, if said at least one armored encapsulation is at least partially damaged, thereby to apply activation or deactivation commands to said control apparatus.

105. The system of claim 90, further comprising at least one locking device for allowing a removal of at least a portion of said at least one armored encapsulation by a predetermined procedure, without causing damage to said at least one armored encapsulation.

106. The system of claim 90, further comprising a bypassing device for bypassing said control apparatus by a predetermined procedure.

107. The system of claim 90, wherein said control apparatus is designed and constructed so as to control motion of an internal plunger of a starter solenoid of the vehicle, thereby to indirectly prevent a starter motor of the vehicle from rotating an engine of the vehicle.

108. A system for preventing theft of a vehicle having at least one essential module being essential to mobilization of the vehicle, the system comprising:
a control apparatus for controlling operation of the at least one essential module,
said control apparatus is operable to limit a motion of a mechanical shift lever being operatively associated with a starter motor of the vehicle, thereby to indirectly prevent said starter motor from rotating an engine of the vehicle; and
at least one armored encapsulation, encapsulating said control apparatus and at least a portion of the at least one essential module;
wherein at least one of a shape, configuration, material, size and location of said at least one armored encapsulation within the vehicle is selected so as to prevent accessing said control apparatus without substantially damaging said at least one armored encapsulation and the at least one essential module, thereby preventing the mobilization of the vehicle.

109. The system of claim 108, wherein the at least one essential module is selected from the group consisting of a starter, an integrated starter-alternator device, a dynostart device, a starter-generator, a power-supply unit, a hand brake, a gearshift selector and an electric part of a hybrid-powered vehicle.

110. The system of claim 108, wherein said at least one armored encapsulation is designed and constructed so as to prevent heating of said control apparatus.

111. The system of claim 108, wherein said at least one armored encapsulation comprises a material characterized by low heat capacity.

112. The system of claim 108, wherein said at least one armored encapsulation comprises at least one reflective layer capable of reflecting heat radiation therefrom.

113. The system of claim 108, wherein said at least one armored encapsulation comprises at least two layers separated by a medium capable of preventing heat convection.

114. The system of claim 108, wherein a body of said at least one armored encapsulation is selected from the group consisting of a shell body and a solid body.

115. The system of claim 108, wherein said control apparatus and said at least said portion of the at least one essential module are each independently integrated in said solid body of said at least one armored encapsulation.

116. The system of claim 108, wherein said at least one armored encapsulation comprises a first part, and a second part being geometrically compatible with said first part, said first and said second parts being rotatable to a plurality of angles.

117. The system of claim 108, further comprising a heat isolating interface, positioned between said at least one armored encapsulation and an engine bay of the vehicle, for preventing heat transfer from said engine to said at least one armored encapsulation.

118. The system of claim 108, wherein said control apparatus comprises at least one electronic circuit assembly being formed in a dielectric material selected to withstand any one of high temperature, moisture, electrical sparks, mechanical vibrations and chemical vapors.

119. The system of claim 108, further comprising a user interface device, electrically communicating with said control apparatus, said user interface device being designed and constructed for activating and deactivating said control apparatus.

120. The system of claim 108, further comprising a communication device, being able to communicate with a remote control center, said communication device being operable to transmit signals to said remote control center and receive responses, if said at least one armored encapsulation is at least partially damaged, thereby to apply activation or deactivation commands to said control apparatus.

121. The system of claim 108, further comprising at least one locking device for allowing a removal of at least a portion of said at least one armored encapsulation by a predetermined procedure, without causing damage to said at least one armored encapsulation.

122. The system of claim 108, further comprising a bypassing device for bypassing said control apparatus by a predetermined procedure.

123. The system of claim 108, wherein said control apparatus is designed and constructed so as to control motion of an internal plunger of a starter solenoid of the vehicle, thereby to indirectly prevent a starter motor of the vehicle from rotating an engine of the vehicle.

124. A system for preventing theft of a vehicle having at least one essential module being essential to mobilization of the vehicle, the system comprising:

a control apparatus for controlling operation of the at least one essential module, said control apparatus comprises a short circuit controlled by a switching device, said short circuit being connected to a power-supply unit of the vehicle so as to bypass at least one electrolytic cell of said power-supply, thereby to control a value of voltage supplied by said power-supply unit; and at least one armored encapsulation, encapsulating said control apparatus and at least a portion of the at least one essential module;

wherein at least one of a shape, configuration, material, size and location of said at least one armored encapsulation within the vehicle is selected so as to prevent accessing said control apparatus without substantially damaging said at least one armored encapsulation and the at least one essential module, thereby preventing the mobilization of the vehicle.

125. The system of claim 124, wherein said at least one armored encapsulation is designed and constructed so as to encapsulate at least one terminal of said power-supply unit, at least one terminal of a starter solenoid of the vehicle and at least one wire connecting said at least one terminal of said power-supply unit and said at least one terminal of said starter solenoid.

126. The system of claim 124, wherein the at least one essential module is selected from the group consisting of a starter, an integrated starter-alternator device, a dynostart device, a starter-generator, a power-supply unit, a hand brake, a gearshift selector and an electric part of a hybrid-powered vehicle.

127. The system of claim 124, wherein said at least one armored encapsulation is designed and constructed so as to prevent heating of said control apparatus.

128. The system of claim 124, wherein said at least one armored encapsulation comprises a material characterized by low heat capacity.

129. The system of claim 124, wherein said at least one armored encapsulation comprises at least one reflective layer capable of reflecting heat radiation therefrom.

130. The system of claim 124, wherein said at least one armored encapsulation comprises at least two layers separated by a medium capable of preventing heat convection.

131. The system of claim 124, wherein a body of said at least one armored encapsulation is selected from the group consisting of a shell body and a solid body.

132. The system of claim 124, wherein said control apparatus and said at least said portion of the at least one essential module are each independently integrated in said solid body of said at least one armored encapsulation.

133. The system of claim 124, wherein said at least one armored encapsulation comprises a first part, and a second part being geometrically compatible with said first part, said first and said second parts being rotatable to a plurality of angles.

134. The system of claim 124, further comprising a heat isolating interface, positioned between said at least one armored encapsulation and an engine bay of the vehicle, for preventing heat transfer from said engine to said at least one armored encapsulation.

135. The system of claim 124, wherein said control apparatus comprises at least one electronic circuit assembly being formed in a dielectric material selected to withstand any one of high temperature, moisture, electrical sparks, mechanical vibrations and chemical vapors.

136. The system of claim 124, further comprising a user interface device, electrically communicating with said control apparatus, said user interface device being designed and constructed for activating and deactivating said control apparatus.

137. The system of claim 124, further comprising a communication device, being able to communicate with a remote control center, said communication device being operable to transmit signals to said remote control center and receive responses, if said at least one armored encapsulation is at least partially damaged, thereby to apply activation or deactivation commands to said control apparatus.

138. The system of claim 124, further comprising at least one locking device for allowing a removal of at least a portion of said at least one armored encapsulation by a predetermined procedure, without causing damage to said at least one armored encapsulation.

139. The system of claim 124, further comprising a bypassing device for bypassing said control apparatus by a predetermined procedure.

140. The system of claim 124, wherein said control apparatus is designed and constructed so as to control motion of an internal plunger of a starter solenoid of the vehicle, thereby to indirectly prevent a starter motor of the vehicle from rotating an engine of the vehicle.

* * * * *